(12) United States Patent
Neitzell et al.

(10) Patent No.: US 10,731,982 B2
(45) Date of Patent: Aug. 4, 2020

(54) LEVEL

(71) Applicant: Milwaukee Electric Tool Corporation, Brookfield, WI (US)

(72) Inventors: Roger D. Neitzell, Pewaukee, WI (US); Richard J. LaSota, Pewaukee, WI (US); Thomas P. Foran, Whitefish Bay, WI (US); Matthew Doyle, Elm Grove, WI (US); Christopher F. Boehme, Pewaukee, WI (US); Matthew Leidel, Wind Lake, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 152 days.

(21) Appl. No.: 15/983,868

(22) Filed: May 18, 2018

(65) Prior Publication Data

US 2018/0266819 A1    Sep. 20, 2018

Related U.S. Application Data

(63) Continuation of application No. 14/939,733, filed on Nov. 12, 2015, now Pat. No. 10,001,371.

(60) Provisional application No. 62/195,037, filed on Jul. 21, 2015, provisional application No. 62/079,062, filed on Nov. 13, 2014.

(51) Int. Cl.
*G01C 9/32* (2006.01)
*G01C 9/36* (2006.01)

(52) U.S. Cl.
CPC ............................ *G01C 9/32* (2013.01); *G01C 9/36* (2013.01)

(58) Field of Classification Search
CPC .................... G01C 9/32; G01C 9/36

USPC .......................... 33/348.2, 379–390
See application file for complete search history.

(56) References Cited

U.S. PATENT DOCUMENTS

| 2,067,474 | A | 1/1937 | Carbonara |
| 2,302,282 | A | 11/1942 | Weibull |
| 2,305,678 | A | 12/1942 | Cravaritis et al. |
| 2,344,241 | A | 3/1944 | Flint |
| 2,353,586 | A | 7/1944 | Reininger |

(Continued)

FOREIGN PATENT DOCUMENTS

| CN | 2056242 | 4/1990 |
| CN | 2588325 | 11/2003 |

(Continued)

OTHER PUBLICATIONS

International Search Report for Application No. PCT/US2015/060422 dated Jan. 26, 2016 (13 pages).

*Primary Examiner* — George B Bennett
(74) *Attorney, Agent, or Firm* — Reinhart Boerner Van Deuren s.c.

(57) ABSTRACT

A level includes a frame having a top planar surface, a bottom planar surface, and a web coupling the top planar surface to the bottom planar surface. The top planar surface and the bottom planar surface are parallel. The level further includes a vial supported by the frame. The vial has a longitudinal axis passing through a center of the vial and a body defining an interior containing a liquid and an indicator bubble. The level further includes a plurality of LEDs. Each of the LEDs has a light emitting point, and each of the plurality of LEDs is positioned adjacent an end of the vial and is oriented such that the light emitting point is positioned within the interior of the body of the vial.

20 Claims, 17 Drawing Sheets

(56) References Cited

U.S. PATENT DOCUMENTS

| | | |
|---|---|---|
| 2,384,453 A | 9/1945 | Chaney et al. |
| 3,160,961 A | 12/1964 | Linehan |
| 3,289,475 A | 12/1966 | Kenyon |
| 3,774,314 A | 11/1973 | Youngs |
| 4,165,818 A | 9/1979 | Cantarella et al. |
| 4,244,117 A | 1/1981 | Cantarella et al. |
| 4,407,075 A | 10/1983 | MacDermott et al. |
| 4,467,527 A | 8/1984 | North et al. |
| 4,506,450 A | 3/1985 | Fleming et al. |
| 4,514,908 A | 5/1985 | Yamaguchi |
| 4,590,680 A | 5/1986 | Hanchett et al. |
| 4,625,423 A | 12/1986 | Sackett |
| 4,716,534 A | 12/1987 | Baucom et al. |
| 4,876,798 A | 10/1989 | Zimmerman |
| 4,932,133 A | 6/1990 | Bruhn |
| 4,989,327 A | 2/1991 | Morton |
| 5,020,232 A | 6/1991 | Whiteford |
| 5,075,978 A | 12/1991 | Crowe |
| 5,157,842 A | 10/1992 | Swanda |
| 5,180,221 A | 1/1993 | Yoder |
| 5,199,177 A | 4/1993 | Hutchins et al. |
| 5,398,422 A | 3/1995 | Clarkson |
| 5,467,533 A | 11/1995 | Dunn |
| 5,713,135 A | 2/1998 | Acopulos |
| 5,956,260 A | 9/1999 | Heger et al. |
| 6,115,928 A | 9/2000 | Dauerer |
| 6,343,422 B1 | 2/2002 | Takahashi |
| 6,526,668 B1 | 3/2003 | Beckhart et al. |
| 6,675,490 B1 | 1/2004 | Krehel et al. |
| 6,748,665 B1 | 6/2004 | Samp |
| 6,792,382 B2 | 9/2004 | Kunitomo |
| 6,836,972 B2 | 1/2005 | Drahos et al. |
| 7,024,781 B1 | 4/2006 | Cowie |
| 7,340,841 B2 | 3/2008 | Montgomery |
| 7,536,801 B2 | 5/2009 | Zhang |
| 7,610,689 B1 | 11/2009 | Zhang |
| 7,743,520 B1 | 6/2010 | Jiorle |
| 7,779,545 B2 | 8/2010 | Kallabis |
| 7,900,366 B2 | 3/2011 | Spaulding |
| 8,151,476 B2 | 4/2012 | Kildevaeld |
| 8,359,757 B1 | 1/2013 | Ruys |
| 8,443,524 B2 | 5/2013 | Kildevaeld |
| 8,499,465 B2 | 8/2013 | Kuta |
| 8,522,446 B1 | 9/2013 | Staudt |
| 8,661,701 B2 | 3/2014 | Wixey et al. |
| 8,925,212 B2 | 1/2015 | Allemand |
| 9,366,532 B2 | 6/2016 | Meadows |
| D856,173 S * | 8/2019 | Wojciechowski ........ G01C 9/26 D10/69 |
| 10,436,584 B2 * | 10/2019 | Gray ..................... G01C 9/26 |
| 2002/0069543 A1 | 6/2002 | Owec et al. |
| 2002/0189116 A1 | 12/2002 | Yang |
| 2003/0005592 A1 | 1/2003 | Wang |
| 2004/0143981 A1 | 7/2004 | Krehel et al. |
| 2005/0166410 A1 | 8/2005 | Richter et al. |
| 2006/0064888 A1 | 3/2006 | Chen |
| 2007/0193046 A1 | 8/2007 | Minsky |
| 2008/0263880 A1 | 10/2008 | Hess |
| 2009/0235544 A1 | 9/2009 | Spaulding |
| 2009/0320303 A1 | 12/2009 | Sparrow |
| 2010/0091283 A1 * | 4/2010 | Marioni ................. G02B 7/003 356/400 |
| 2011/0005091 A1 | 1/2011 | Pedersen |
| 2011/0099823 A1 * | 5/2011 | Christianson ............ G01C 9/28 33/379 |
| 2011/0119938 A1 | 5/2011 | Kildevaeld |
| 2011/0119940 A1 | 5/2011 | Zerhusan |
| 2011/0271537 A1 | 11/2011 | Scheyer |
| 2012/0246950 A1 | 10/2012 | Murray et al. |
| 2013/0091717 A1 | 4/2013 | Steele |
| 2013/0227849 A1 | 9/2013 | Kildevaeld |
| 2014/0090259 A1 | 4/2014 | Stockdill |
| 2014/0101950 A1 | 4/2014 | Zhaung |
| 2015/0308821 A1 | 10/2015 | Zwing et al. |
| 2015/0308822 A1 | 10/2015 | Meadows |
| 2017/0003125 A1 | 1/2017 | Chi |

FOREIGN PATENT DOCUMENTS

| | | |
|---|---|---|
| DE | 1966908 | 8/1967 |
| DE | 2318472 | 10/1974 |
| DE | 2754030 | 6/1979 |
| DE | 7903570 | 9/1979 |
| DE | 3035686 | 5/1982 |
| DE | 8321554 | 11/1983 |
| DE | 8314333 | 1/1984 |
| DE | 20011458 | 9/2000 |
| DE | 10300088 | 7/2004 |
| DE | 102005032208 | 1/2007 |
| EP | 3932024 | 7/1999 |
| EP | 1167921 | 1/2002 |
| EP | 2098819 | 1/2015 |
| GB | 2371863 | 8/2002 |
| GB | 2399635 | 9/2004 |
| JP | 2002048538 | 2/2002 |
| JP | 3133351 | 7/2007 |
| KR | 200373845 | 1/2005 |
| WO | WO1993005361 | 3/1993 |
| WO | WO1999063305 | 12/1999 |
| WO | WO2007059053 | 5/2007 |
| WO | WO2008058724 | 5/2008 |
| WO | WO2008115148 | 9/2008 |
| WO | WO2011070562 | 6/2011 |

* cited by examiner

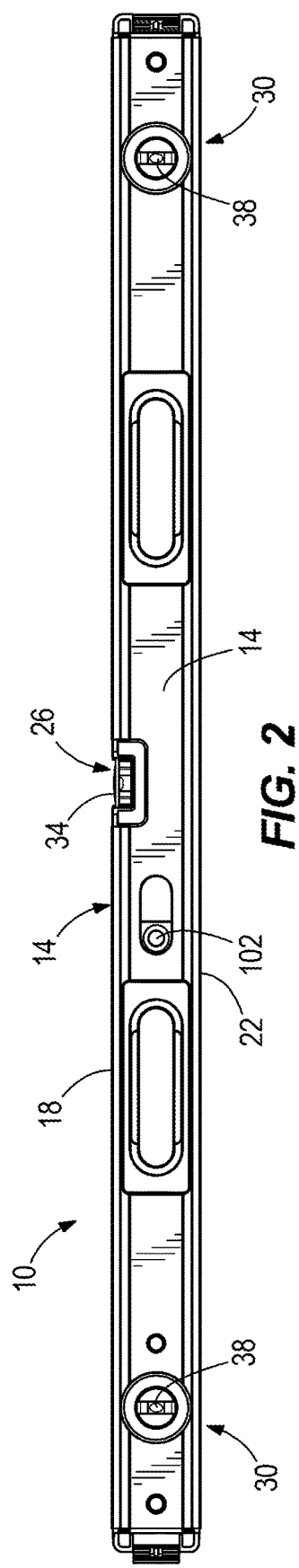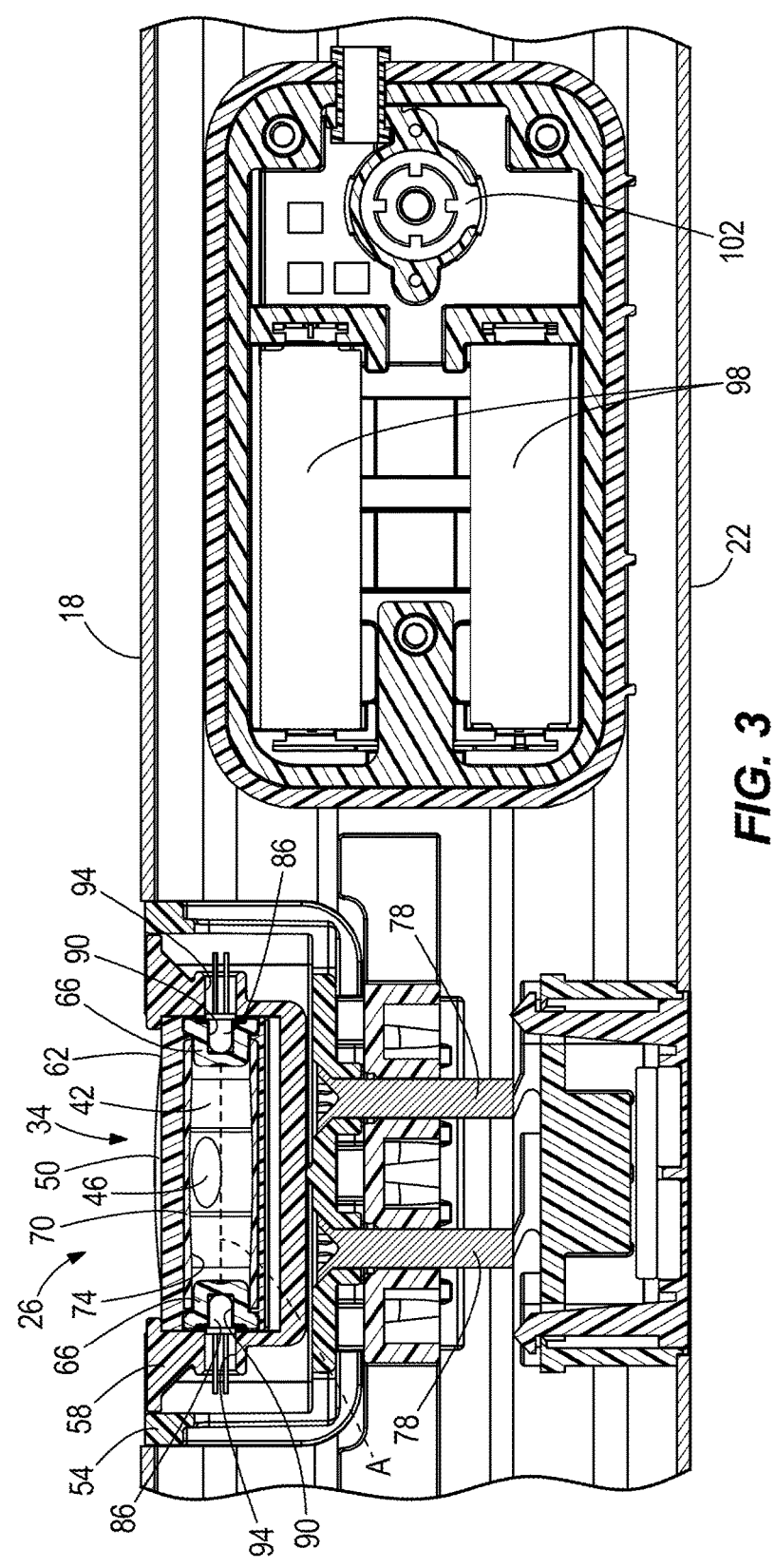

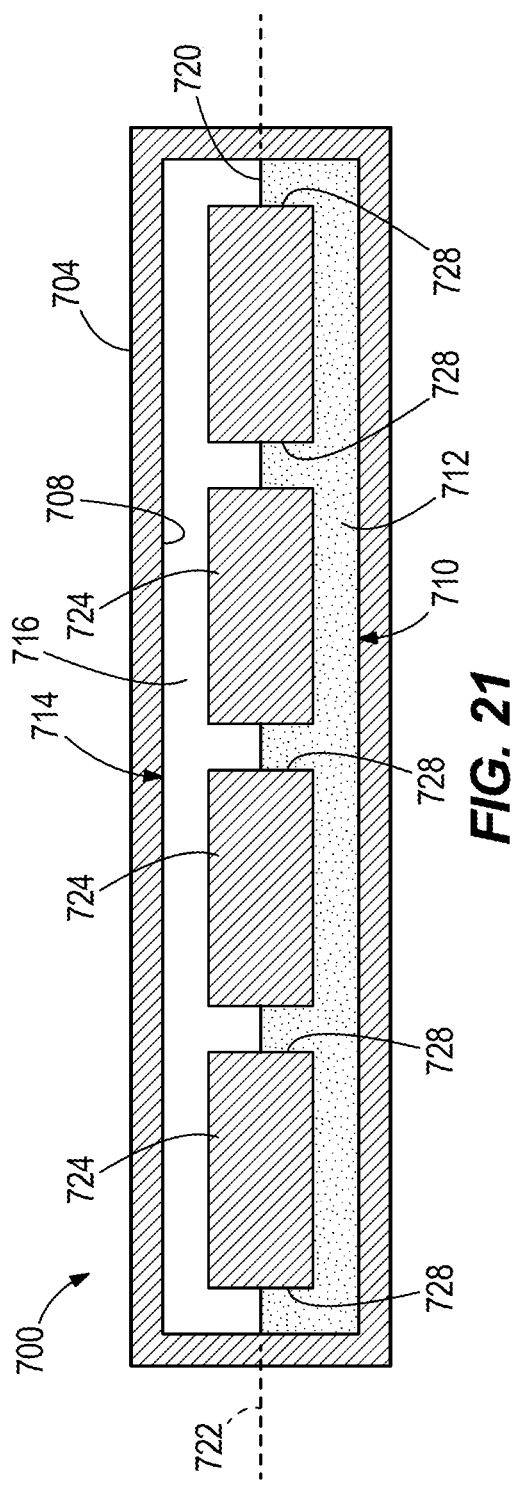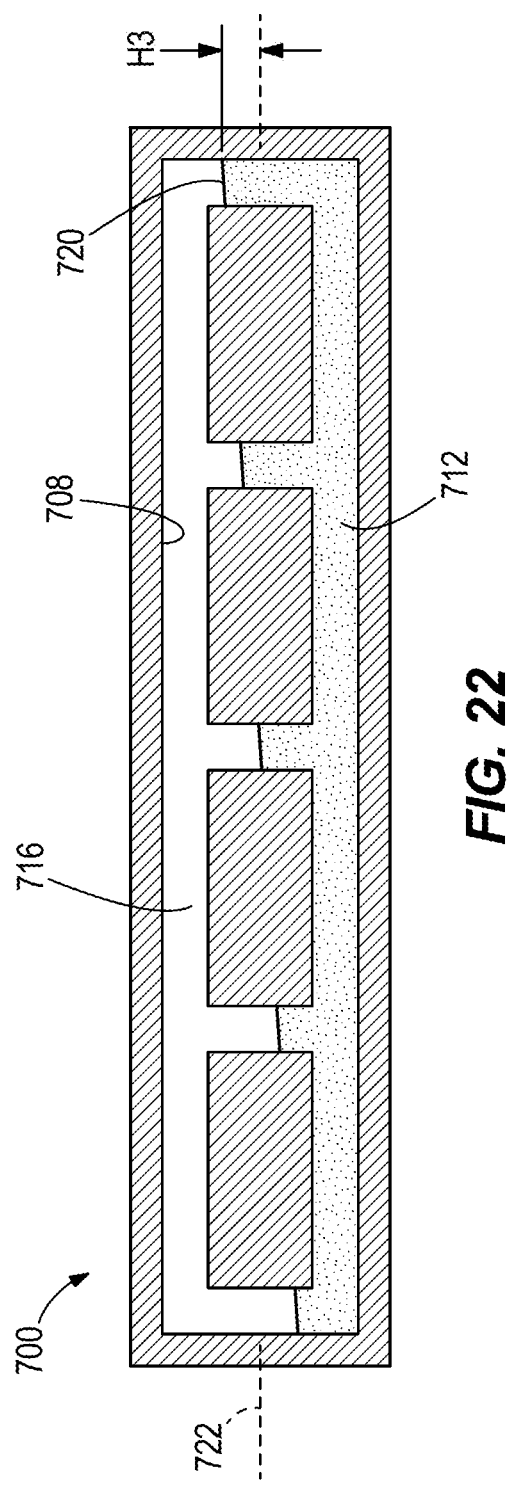

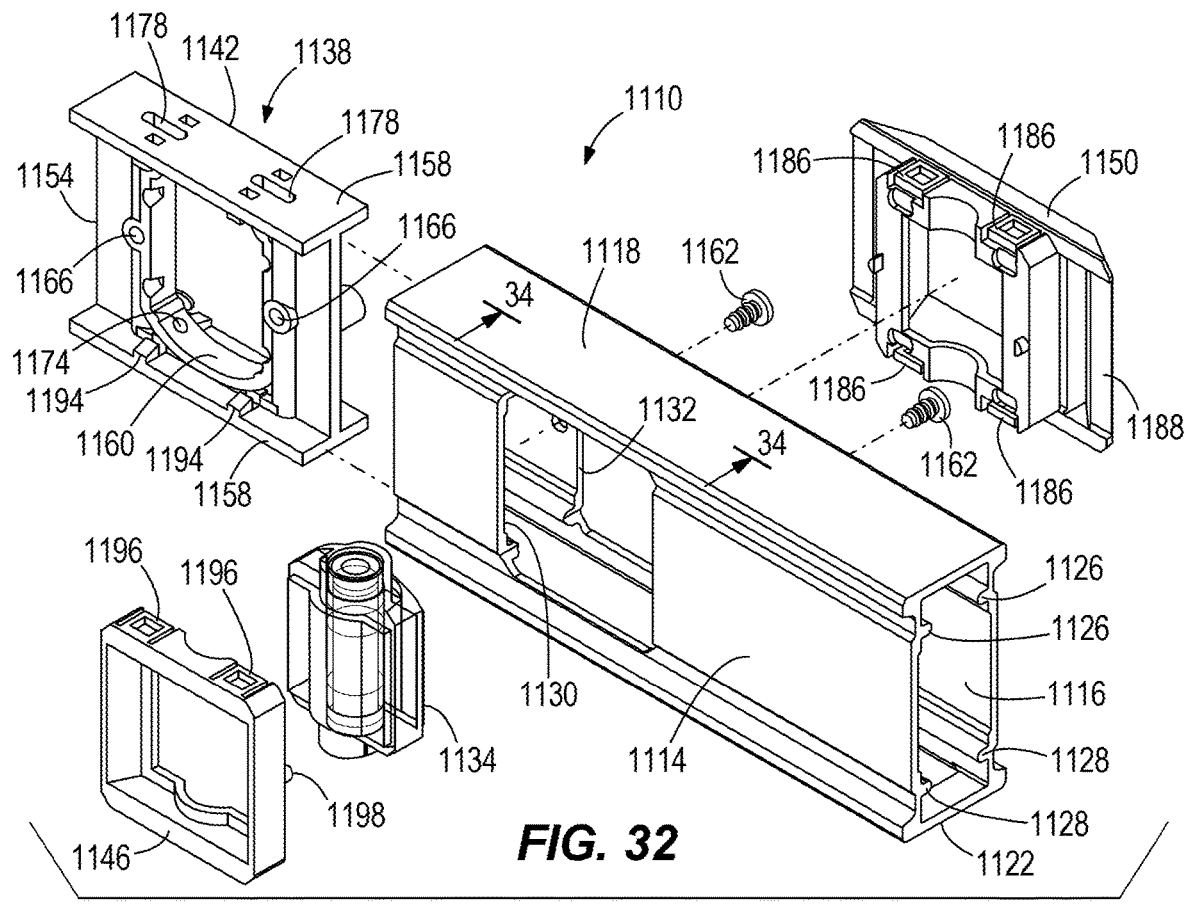
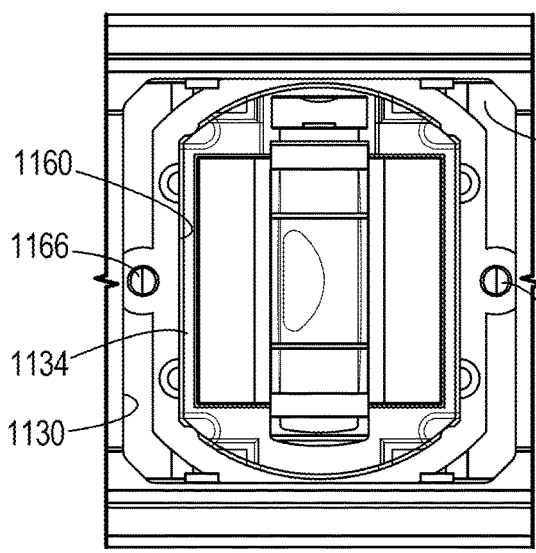
FIG. 33
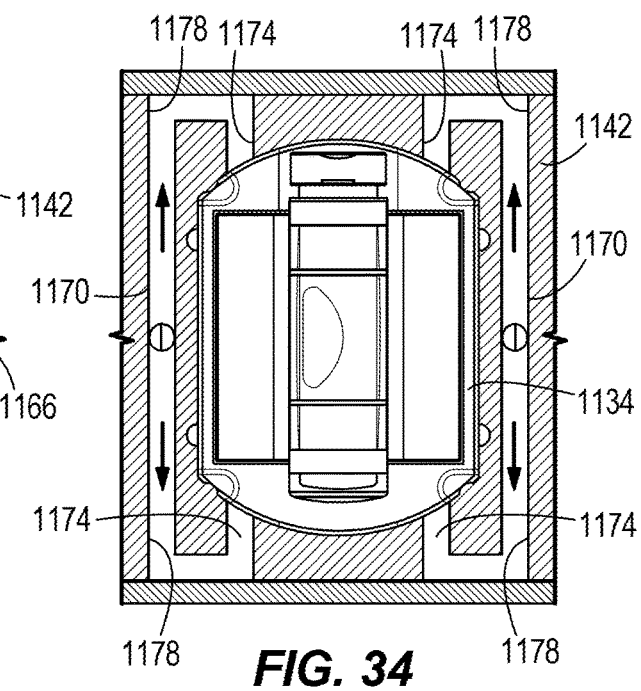
FIG. 34

LEVEL

CROSS-REFERENCE TO RELATED APPLICATIONS

This application is a continuation of U.S. application Ser. No. 14/939,733, filed on Nov. 12, 2015, which claims priority to U.S. Provisional Patent Application No. 62/079,062, filed on Nov. 13, 2014; and to U.S. Provisional Patent Application No. 62/195,037, filed on Jul. 21, 2015, the entire contents of all of which are incorporated by reference herein.

BACKGROUND OF THE INVENTION

The present invention relates to vials for levels, and more particularly to vials with improved visibility. The present invention further relates to levels having LEDs to illuminate the vials.

Levels are typically used for determining whether an object or surface is level to a particular surface or adjusting an object to a level surface. Levels are typically used to measure and level at various angles (e.g., 0 degrees, 30 degrees, 45 degrees and 90 degrees). Levels typically include a vial that includes spirit (i.e., fluid) and a bubble suspended in the spirit. As the level tilts the bubble shifts in the vial to indicate if the level is at the desired angle. For low light situations some levels include light sources to illuminate the vials and provide increased visibility and readability.

SUMMARY OF THE INVENTION

In one embodiment, the invention provides a level that includes a frame having a top planar surface, a bottom planar surface, and a web coupling the top planar surface to the bottom planar surface. The top planar surface and the bottom planar surface being parallel. The level further includes a vial supported by the frame. The vial having a longitudinal axis passing through a center of the vial and a body defining an interior containing a liquid and an indicator bubble. The level further includes a plurality of LEDs. Each of the LEDs has a light emitting point, and each of the plurality of LEDs is positioned adjacent an end of the vial and is oriented such that the light emitting point is positioned within the interior of the body of the vial.

In another embodiment, the invention provides a level that includes a frame having a top planar surface, a bottom planar surface, and a web coupling the top planar surface to the bottom planar surface. The top planar surface and the bottom planar surface are parallel. The level further includes a plurality of vials each supported by the frame including a first vial having a first longitudinal axis that is oriented in a first vial orientation, and a second vial having a second longitudinal axis that is oriented in a second vial orientation not parallel with the first vial orientation. The level further includes a first light source associated with the first vial, and a second light source associated with the second vial. The level further includes an orientation sensor that is electrically coupled to the plurality of light sources. The orientation sensor is configured to turn on the first light source when the level is in a first level orientation corresponding to the first vial orientation to illuminate the first vial, and to turn on the second light source when the level is in a second level orientation corresponding to the second vial orientation of the second vial to illuminate the second vial.

In yet another embodiment, the invention provides a level that includes a frame having a top planar surface, a bottom planar surface, and a web coupling the top planar surface to the bottom planar surface. The top planar surface and the bottom planar surface are parallel. The level further includes a vial supported by the frame. The level further includes a first constituent contained within the vial, a second constituent contained within the vial and movable within the first constituent in response to orientation of the level, and a third constituent contained within the vial and cooperating with the first and second constituents to increase visibility of the second constituent within the first constituent.

Other features and aspects of the invention will become apparent by consideration of the following detailed description and accompanying drawings.

BRIEF DESCRIPTION OF THE DRAWINGS

FIG. 2 is a side view of the level of FIG. 1.

FIG. 3 is a cross-sectional side view of the level of FIG. 1 taken along line 3-3.

FIG. 21 is a cross-sectional side view of a vial in a horizontal position.

FIG. 22 is a cross-sectional side view of the vial of FIG. 21, illustrated in a tilted position relative to the horizontal position of FIG. 21.

FIG. 32 is an enlarged exploded view of a level.

FIG. 33 is a side planar view of the level of FIG. 32, illustrating a cartridge inserted within a frame of the level.

FIG. 34 is a cross sectional side view of the level of FIG. 32, illustrating internal channels of the cartridge.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
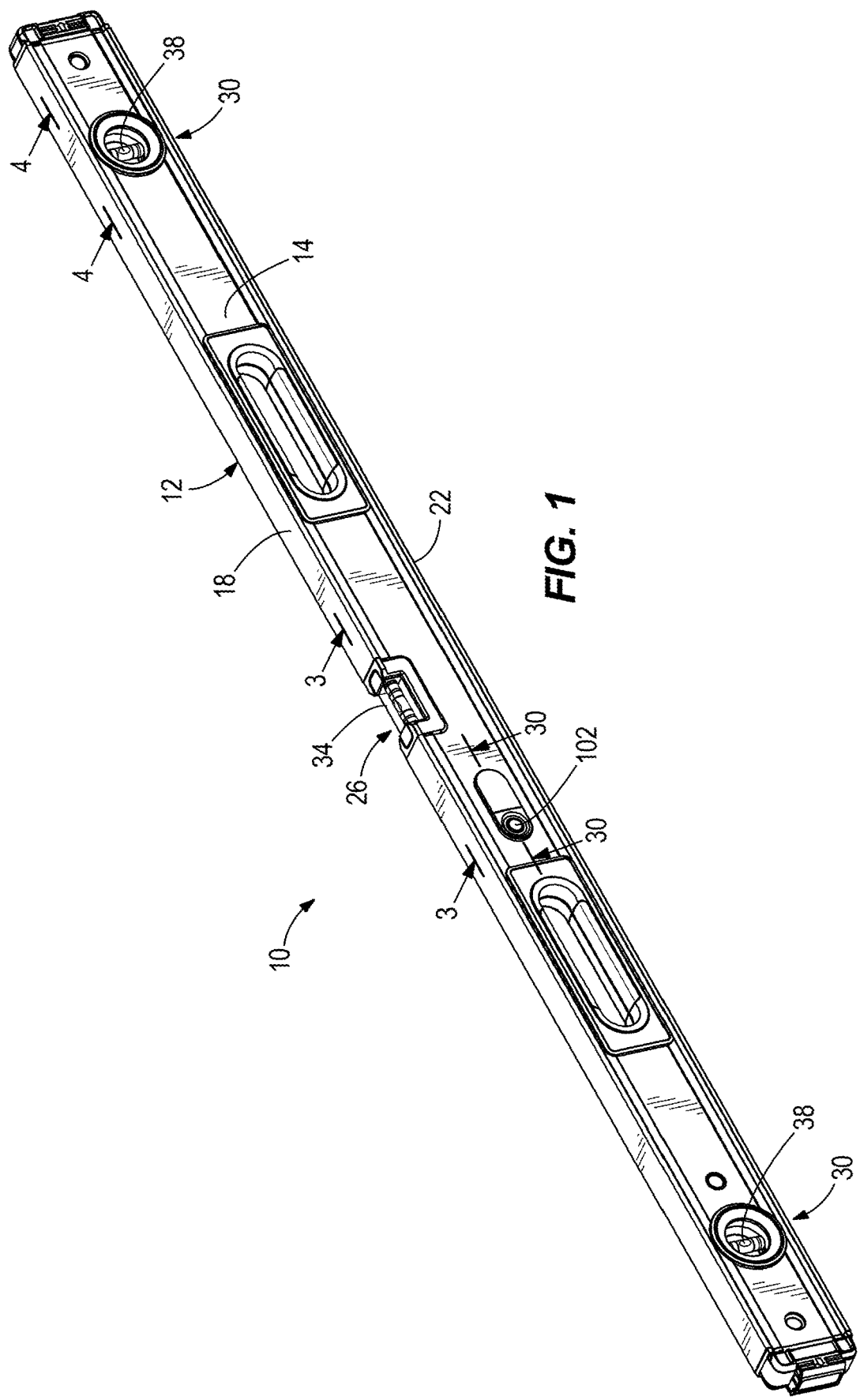
FIG. 1 is a perspective view of a level embodying the invention.

FIGS. 1-2 illustrate a level 10 for determining whether an object or surface is level relative to true horizontal or adjusting an object or surface to be a level surface relative to true horizontal. The level 10 may be used to measure and level at different angles, e.g., 0 degrees, and 90 degrees. In alternate embodiments the level 10 may be used to measure and level at additional angles, e.g., 30 degrees, and 45 degrees. It should be readily apparent that the level 10 may be used by a variety of users and skilled technicians to perform a variety of leveling functions.

In the illustrated embodiment, the level 10 is a box type level and has a frame 12 that includes a pair of parallel webs 14 coupled to each of a top planar surface 18, and a bottom planar surface 22. The top planar surface 18 is spaced apart from and substantially parallel to the bottom planar surface 22. The pair of parallel webs 14, top planar surface 18, and the bottom planar surface 22, define a hollow box-shaped interior of the level 10.

Figure 4:
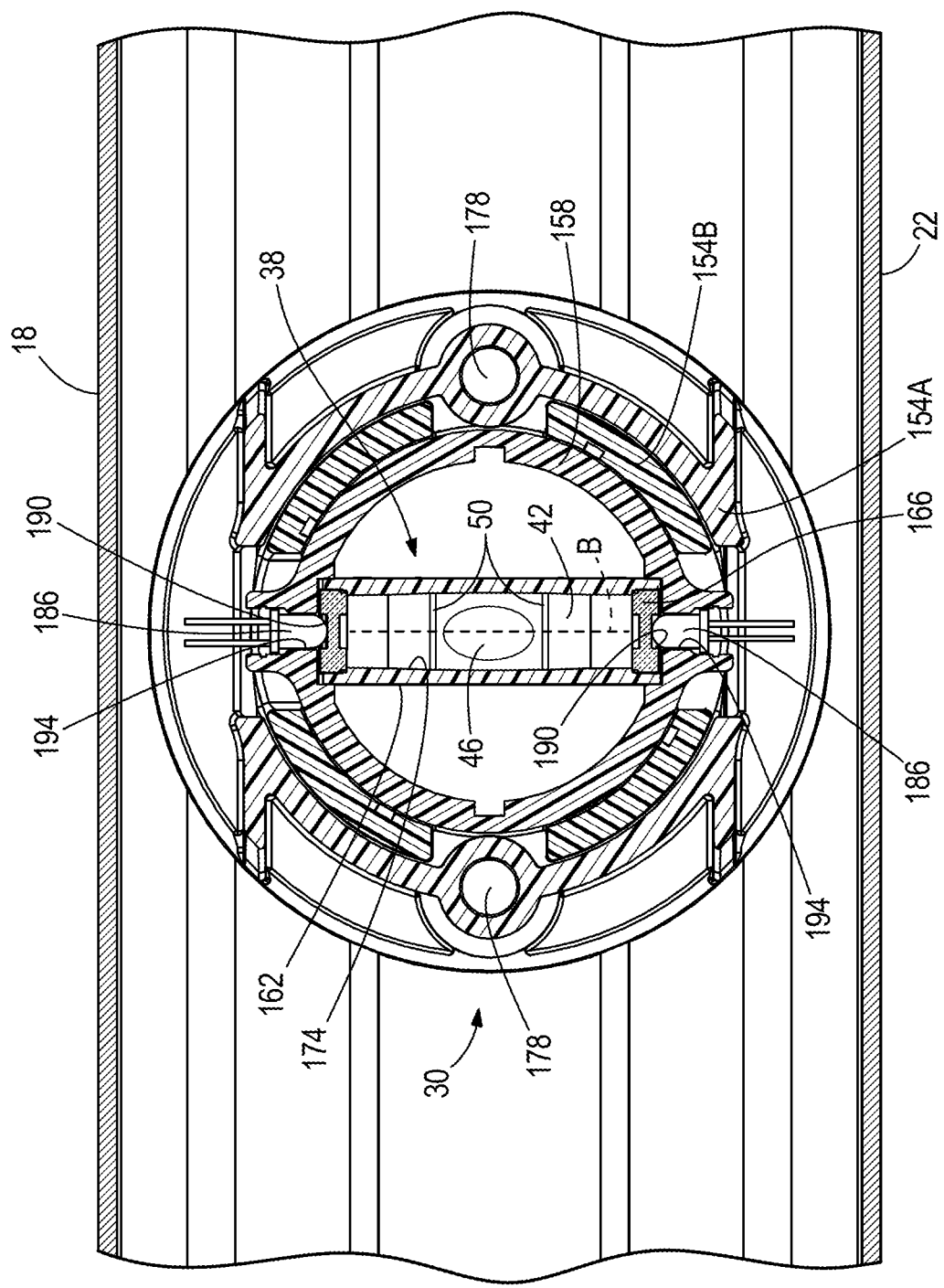
FIG. 4 is a cross-sectional side view of the level of FIG. 1 taken along line 4-4.

The frame 12 also supports a plurality of vial assemblies 26, 30. In the illustrated embodiment, the frame 12 supports three vial assemblies, a level or horizontal vial assembly 26, and a pair of plumb or vertical vial assemblies 30. Each of the vial assemblies 26, 30 includes a corresponding vial 34, 38. The vial 34, or 0-degree, or horizontal vial, of the horizontal vial assembly 26 is a level vial for measuring horizontal (i.e., level) and has a longitudinal axis A that is parallel with the top planar surface 18 and the bottom planar surface 22, as shown in FIG. 3. The vials 38, or 90-degree vials, or vertical vials, of the vertical vial assembly 30 are plumb vials for measuring vertical (i.e., plumb), each having a longitudinal axis B that is perpendicular to the top planar surface 18 and the bottom planar surface 22, as shown in FIG. 4. In other embodiments, the frame 12 may support fewer or more vial assemblies and corresponding vials. For example, one or more additional vials each with a longitudinal axis that is oriented at 30 degrees, or 45 degrees relative to the top planar surface 18 and the bottom planar surface 22. As shown in FIGS. 3 and 4, each of the vials 34, 38 contains a liquid 42, a gas bubble 46, and a series of markings 50. The gas bubble 46 is suspended in the liquid 42 and acts as an indicator relative to the markings 50. In some embodiments, the liquid 42 and the gas bubble 46 may be replaced with a first and second fluid that are immiscible relative to one another, as discussed below. Additionally, each of the vials 34, 38 is made of glass, acrylic, plastic, or other material that is at least partially transparent to allow for viewing of the liquid 42 and the gas bubble 46 within the vials 34, 38.

As the angle of the level 10 (and therefore the angle of each of the vials 34, 38) changes relative to a fixed axis (i.e., gravity, true horizontal, etc.), the gas bubble 46 moves within each of the vials 34, 38 along the long axis A, B. Each of the vials 34, 38 can be used to determine the orientation of a surface or object to be leveled relative to the level 10 (i.e., the fixed axis). The position of the gas bubble 46 with respect to the markings 50 allows the user to determine the orientation of the surface or object to be leveled relative to the corresponding vial 34, 38. For example, when the top planar surface 18 engages the surface or object to be leveled, the surface or object to be leveled is level (i.e., horizontal) when the gas bubble 46 is centered along the long axis A of the horizontal vial 34 between the markings 50.

With reference to FIG. 3, in the illustrated embodiment, the horizontal vial assembly 26 further includes an outer mounting structure 54 and an inner mounting structure 58. The vial 34 of the horizontal vial assembly 26 includes a vial body 62, a pair of vial end caps 66, and an inner sleeve 70. The vial body 62 defines a barrel shaped bore or interior 74 that contains the liquid 42 and the gas bubble 46. The inner sleeve 70 is positioned within the bore 74, such that an outer surface of the inner sleeve 70 is in contact with a surface of the bore 74. Each of the pair of vial end caps 66 is received within the bore 74 at opposing ends of the vial body 62 to retain the liquid 42 and the gas bubble 46 within the bore 74.

The outer mounting structure 54 is secured to the frame 12 via screws 78. The outer mounting structure 54 has a generally U-shaped structure and is configured to be received in a U-shaped cutout 82 extending through the top planar surface 18 and the pair of webs 14. The inner mounting structure 58 also has a generally U-shaped structure and is supported by the outer mounting structure 54. The inner mounting structure 58 is calibrated relative to the outer mounting structure 54 and secured within the outer mounting structure 54 via adhesive. The inner mounting structure 58 supports the vial 34. In some embodiments the outer mounting structure 54 includes snap-fits to secure the horizontal vial assembly 26 to the frame 12, or may be secured by other fastening methods. In alternate embodiments, the vial 34 may be secured to the frame 12 by any means that holds the vial 34 in place, for example, by threaded set screws, or adhesive.

The horizontal vial assembly 26 also includes an ultraviolet (UV) light source. As shown in FIG. 3, the UV light source includes a pair of light emitting diodes 86 (LEDs) that emit UV light. In the illustrated embodiment, the LEDs are aligned along the longitudinal axis A of the vial 34. The LEDs 86 are each received within a corresponding well or recess 90 defined in each of the vial end caps 66, such that the vial end caps 66 support the LEDs 86. Each of the LEDs 86 have electrical leads that extend through a corresponding aperture 94 in the inner mounting structure 58. Each LED 86 is configured to emit UV light within the vial 34 when receiving power. In some embodiments, the LEDs 86 may emit light having a wavelength between about 375 nanometers and about 410 nanometers. In other embodiments, the LEDs 86 may emit light having other wavelengths within (or outside of) the UV spectrum. In alternate embodiments, the LEDs 86 may emit another color (i.e., wavelength) of light all together, such as light within the visible light spectrum. In such embodiments, the visible light may be any color desired.

The vial assembly 26 also includes an ultra-violet (UV) sensitive component. The UV sensitive component reacts to UV light, making the vial 34 more visible to a user. In the illustrated embodiment, the UV sensitive component includes the inner sleeve 70, or optical brightener sleeve. The optical brightener sleeve 70 includes an additive embedded therein. During manufacture of the optical brightener sleeve 70, the additive may be mixed with and dispersed within the glass, acrylic, plastic, or other material that makes up the inner sleeve 70. The additive causes UV light rays emitted by the LEDs 86 to react with the inner sleeve 70 as they are transmitted outward from the axis A of the vial 34, making the vial 34 more visible to the user. Specifically, the additive within the inner sleeve 70 absorbs a portion of the UV light rays emitted by the LEDs 86. The absorbed UV light reacts with the additive causing the additive to emit visible light. The visible light emitted by the reaction causes the vial 34 to be brightened and more visible to a user. In other words, the additive within the optical brightener sleeve 70 causes the optical brightener sleeve 70, and therefore the vial 34, to glow (i.e., fluoresce or luminesce), thereby making the vial 34 more visible to the user, when exposed to UV light emitted from the LEDs 86. The wavelength of light emitted by the LEDs 86, and the corresponding UV sensitive components of the vial 34, can be chosen based on the desired glow color of the vial 34 (e.g., red, blue, etc.). Additionally, a portion of the UV light rays are reflected within the sleeve 70 back toward the axis A of the vial 34, most of the reflected UV light rays are eventually absorbed, thereby increasing dispersion and absorption of the UV light rays emitted by the LEDs 86.

Figure 11:
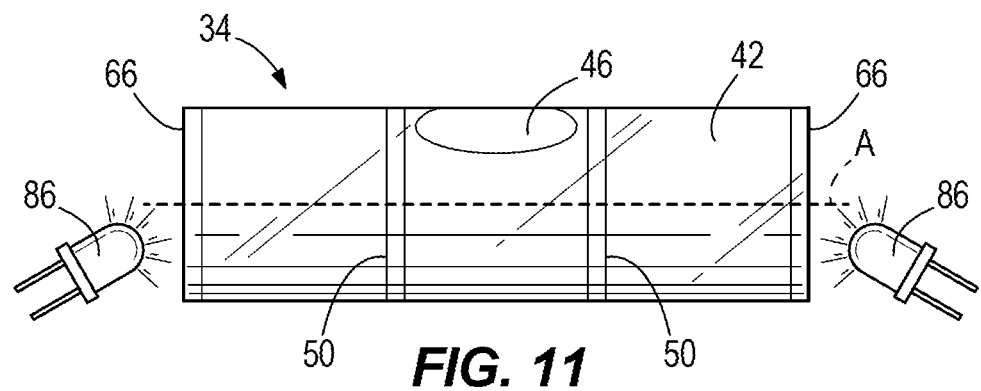
FIG. 11 illustrates the vial and two LEDs arranged in a third configuration.

With continued reference to FIG. 3, the LEDs 86 are positioned on opposite ends of the vial 34 and aligned along the long axis A such that light is distributed within the bore 74 of the vial 34 and reflected by the optical brightener sleeve 70 symmetrically, thereby illuminating the vial 34 more equally throughout. The vial end caps 66 each extend into the vial 34 such that the LEDs 86 extend at least partially into the bore 74 of the vial body 62. In the illustrated embodiment, the optical brightener sleeve 70 is positioned within the bore 74 of the vial body 62 to extend over the vial end caps 66. Further, the LEDs 86 are supported within the vial end caps 66 such that a light emitting point of each of the LEDs 86 is positioned axially within the optical brightener sleeve 70. The light emitting point is defined as the rearmost center point of a light emission cone, hemisphere, or sphere emitted by one of the LEDs 86 (i.e., a light origin point of one of the LEDs 86). In other words, the optical brightener sleeve 70 surrounds the light emitting point in all the directions in which light is emitted (in this example a hemisphere) such that most UV light emitted by the LEDs 86 reacts with or is reflected by the optical brightener sleeve 70 increasing dispersion within the vial 34, and thereby increasing the visibility of the vial 34. In alternate embodiments, the LEDs 86 may be offset relative to the longitudinal axis A of the vial 34 and tilted relative to the longitudinal axis A of the vial 34 such that a center of light is not directed directly axially along the axis A within vial 34, but rather at an angle to the long axis A and toward the optical brightener sleeve 70, as shown in FIG. 11 and described below. This configuration allows for increased reflection and dispersion of the UV light rays within the optical brightener sleeve 70.

In alternate embodiments, the UV sensitive component includes the additive embedded within the vial body 62 directly, in addition to, or in lieu of, the optical brightener sleeve 70. Similar to the optical brightener sleeve 70, during manufacture of the vial 34, the additive may be mixed with and dispersed within the glass, acrylic, plastic, or other material that makes up the vial 34. Additionally or alternatively, the UV sensitive component (i.e., the optical brightener sleeve 70 and/or the vial body 62) may include a coating (e.g., an acrylic substrate) applied to a surface. In such embodiments, the coating may include additional additives to increase the intensity of the glow when exposed to UV light, or alternatively the coating may be reflective to increase dispersion within the vial.

In further alternate embodiments, the UV sensitive component includes a UV sensitive liquid, rather than the liquid 42 contained within the vial 34, in addition to, or in lieu of, the optical brightener sleeve 70. The UV sensitive liquid helps increase the visibility of the gas bubble 46. In some embodiments, the liquid may be a fluorescent or phosphorescent chemical. In alternate embodiments, an additive may be added to the liquid 42 to make the liquid 42 UV sensitive, such that when exposed to UV light, the UV sensitive liquid glows (i.e., fluoresces or luminesces), thereby increasing the contrast between the liquid 42 and the bubble 46.

In further alternate embodiments, the vial 34 may include two liquids (rather than a liquid 42 and a gas bubble 46). The first liquid fills a majority of the vial 34 and is a UV sensitive liquid. The second liquid fills a minority of the vial 34 and is not sensitive to UV light. The second liquid is also immiscible with the first liquid so that the two liquids remain separate. When exposed to UV light, the second liquid would provide a relatively dark spot within the vial 34. Alternatively, the second liquid could be UV sensitive, and the first liquid could be insensitive to UV light. In such embodiments, the second liquid glows brighter than the first liquid when exposed to UV light, such that the gas bubble 46 contrasts within the liquid 42 increasing visibility of the gas bubble 46. In embodiments in which the vial 34 contains or is coated with the UV sensitive component, the first liquid and the second liquid may have contrasting colors that become more visible when the vial 34 glows. In further embodiments, the two liquids may both be UV sensitive, but have different colors and/or intensities when exposed to UV light. Alternatively, the two liquids could both be insensitive to UV light, but have a high contrast in certain colors.

With reference to FIG. 4, in the illustrated embodiment, each of the vertical vial assemblies 30 further includes a plurality of outer mounting structures 154A, 154B and a pair of inner mounting structures or vial surrounds 158. Similar to the vial 34 of the horizontal vial assembly 26, the vial 38 of each of the vertical vial assemblies 30 includes a cylindrical vial body 162 that defines a barrel shaped bore or interior 174 containing the liquid 42 and the gas bubble 46, and a pair of vial end caps 166. The vial 38 is supported between the pair of inner mounting structures 158. The pair of inner mounting structures 158 is made of glass, acrylic, plastic, or other material that is at least partially transparent to allow the vial 38 to be viewed through the inner mounting structures 158. The inner mounting structures 158, and thus the vial 38, are supported between the plurality of outer mounting structures 154A, 154B. The plurality of outer mounting structures 154A, 154B are secured together via a pair of screws 178. Each of the vertical vial assemblies 30 are mounted in a circular cut out 182 that extends through the webs 14. Each of the outer mounting structures 154A, 154B defines a viewing window for viewing the vial 38. In alternate embodiments, the vials 38 of vertical vial assemblies 30 may be secured to the frame 12 by any means that hold the vials 34 in place (e.g., epoxy or other adhesives).

With continued reference to FIG. 4, similar to the horizontal vial assembly 26, each of a pair of vial end caps 166 is received at opposing ends of the vial body 162 within the bore 174 to retain the liquid 42 and the bubble 46 within the bore 174. Each of the vertical vial assemblies 30 further includes a pair of LEDs 186. The LEDs 186 are each supported by the inner mounting structures 158 and received within an aperture 194 defined when both the inner mounting structures 158 are combined. The aperture 194 aligns the LED 186 with the longitudinal axis B of the vial 38. Similar to the LEDs 86 of the horizontal vial assembly 26, the LEDs 186 are at least partially received by a corresponding well 90 defined by each of the vial end caps 166, such that the LEDs 186 axially extend along the longitudinal axis B of the vial 38 into the bore 74. Specifically, the light emitting point of each of the LEDs 186 is positioned axially within the vial body 162. The LEDs 186 may be configured to emit visible light, UV light, or any other type of light to illuminate the vials 38.

In alternate embodiments, each of the vials 38 may include an optical brightener sleeve similar to the optical brightener sleeve 70 of the horizontal vial assembly 26, as described above and shown in FIG. 3. Furthermore, the vials 38 of the vertical vial assemblies 30 may include any of the UV sensitive components as described above with respect to the horizontal vial assembly 26 to increase the visibility of any one, or all, of the vial 38, the liquid 50, and the bubble 46. For example, the inner or outer surface of the vial body 162 may include a coating (e.g., an acrylic substrate) applied to a surface that glows or illuminate when exposed to UV light.

In further alternate embodiments, the UV sensitive component includes the additive embedded within the pair of vial surrounds 158. Similar to the optical brightener sleeve 70 of the horizontal vial assembly 26, during manufacture of the pair of vial surrounds 158 the additive may be mixed with and dispersed within the glass, acrylic, plastic, or other material that makes up the vial surrounds 158. Additionally or alternatively, the UV sensitive component (i.e., the optical brightener and/or the vial body 162) may include a coating (e.g., an acrylic substrate) applied to a surface. In such embodiments, the coating may include additional additives to increase the intensity of the glow when exposed to UV light, or alternatively the coating may be reflective to increase dispersion within the vial.

Figure 9:
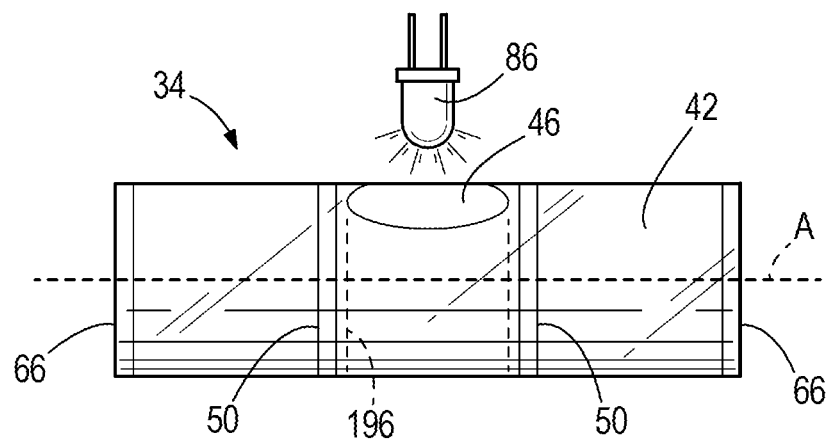
FIG. 9 illustrates a vial and an LED arranged in a first configuration.

FIGS. 9-12 illustrate various alternative configurations for positioning the LEDs 86, 186 relative to the vials 34, 38 for both the horizontal and vertical vial assemblies 30. Although, illustrated and described with reference to the LEDS 86 and the vial 34 of the horizontal assembly 26, the configurations apply equally to the LEDs 186 and vial 38 of the vertical vial assemblies 30. As shown in FIG. 9, rather than include a pair of LEDS 86, a single one of the LEDS 86 is positioned adjacent a side of the corresponding vial 34 (i.e., radially spaced from a longitudinal axis A of the vial 34). When the LED 86 emits UV light toward the vial 34, the vial 34 and/or the liquid 42 contained with the vial 34 is illuminated. The bubble 46 (or second liquid) casts a shadow along a section of the vial 34. The shadow forms a band or strip 196 within the vial 34 that is easily visible to a user relative to the markings 50, thus, providing increased visibility and readability. In some embodiments, the LED 86 is supported by the frame 12. In other embodiments the LED 86 may be supported by the inner or outer mounting structure 54, 58 of the horizontal vial assembly 26, or the inner or outer mounting structures 154A, 154B, 158 of the vertical vial assemblies 30.

Figure 10:
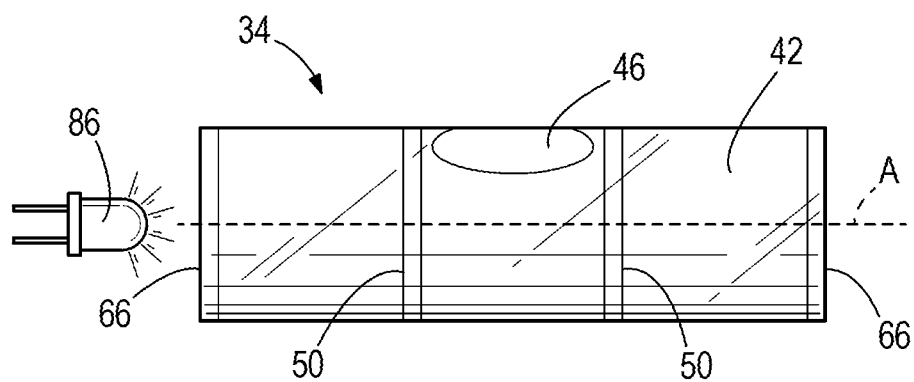
FIG. 10 illustrates the vial and the LED arranged in a second configuration.

As shown in FIG. 10, rather than including two LEDS 86 positioned adjacent opposite ends, in some configurations only one LED 86 is positioned adjacent an end of the vial 34 along the longitudinal axis A of the vial 34. When the LED 86 emits UV light toward the vial 34, the UV light travels through the vial 34 to illuminate the vial 34 and/or the liquid 42 contained within the vial 34. The bubble 46 (or second liquid) is not illuminated and is, therefore, easily visible to a user. Alternatively, the bubble 46 may be illuminated, but contrast the liquid 42 to be easily visible to the user. Although not shown, the LED 86 may be supported by one of the vial end caps 66 of the vial 34.

As shown in FIG. 11, the vial 34 is associated with the pair of LEDS 86. One LED 86 is positioned adjacent each end of the vial 34 similar to the embodiment illustrated in FIGS. 1-4. However, the LEDs 86 are tilted relative to the central longitudinal axis A of the vial 34. In addition, the LEDs 86 are offset relative to the central longitudinal axis A of the vial 34. In some embodiments, the LEDs 86 may be only tilted or only offset relative to the central longitudinal axis A of the vial 34. Although, not shown, the LEDs 86 may be supported by the end caps 66 of the vial 34. The wells 90 of the vial end caps 66 may be configured to be tilted and/or offset relative to the longitudinal axis A of the vial 34 to facilitate supporting the LEDs 86 in this orientation. In some embodiments, each of the wells 90 of the vial end caps 66 has an axis that forms an angle with the longitudinal axis A of the vial 34 that is between about 15 degrees and about 45 degrees (e.g., about 20, degrees, about 25 degrees, about 30 degrees, about 35 degrees, and about 40 degrees). In such embodiments, the LEDs 86 are received within the wells 90 such that each of the LEDs 86 are coaxial with the corresponding axis of the wells 90 and thus are oriented relative to the longitudinal axis A of the vials 34 at an angle corresponding to the angle between the axis of the wells 90 and the longitudinal axis A of the vials 34. This causes the light emitted by the LEDs 86 to be directed at angle to the longitudinal axis A rather than directly axially along the longitudinal axis A. If an optical brightener sleeve 70 is used, increased reflection of light will occur increasing the efficiency of light dispersion and absorption within the vial 34.

Figure 12:
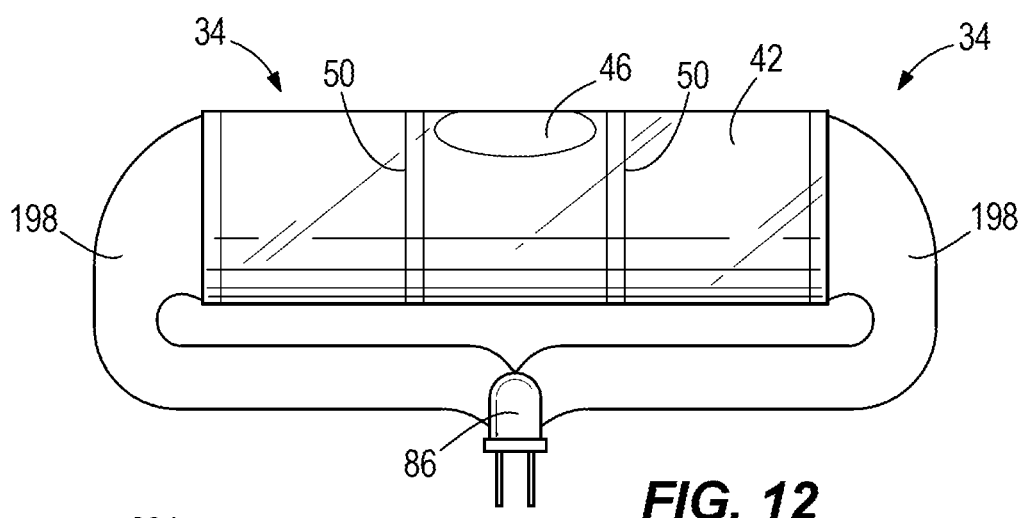
FIG. 12 illustrates the vial and an LED arranged in a fourth configuration.

As shown in FIG. 12, a single one of the LEDs 86 is in communication with the vial 34 via light pipes 198. The light pipes 198 may be, for example, tubes, cables (fiber optic), or fibers capable of transmitting light. The illustrated light pipes 198 direct light from the LED 86 to both ends of the vial 34. In other embodiments, the light pipes 198 may direct light to only one end of the vial 34. Additionally, the light pipes 198 allow the LED 86 to be positioned in any location relative to the vial 34. In some embodiments, when the light pipes 198 are used in combination with the optical brightener sleeve 70, a light emitting point of each of the light pipes 198 may be positioned axially within the optical brightener sleeve 70 to reflect all or nearly all the light emitted from the light pipes 198, thus, increasing the efficiency of light dispersion and absorption within the vial 34.

Figure 5:
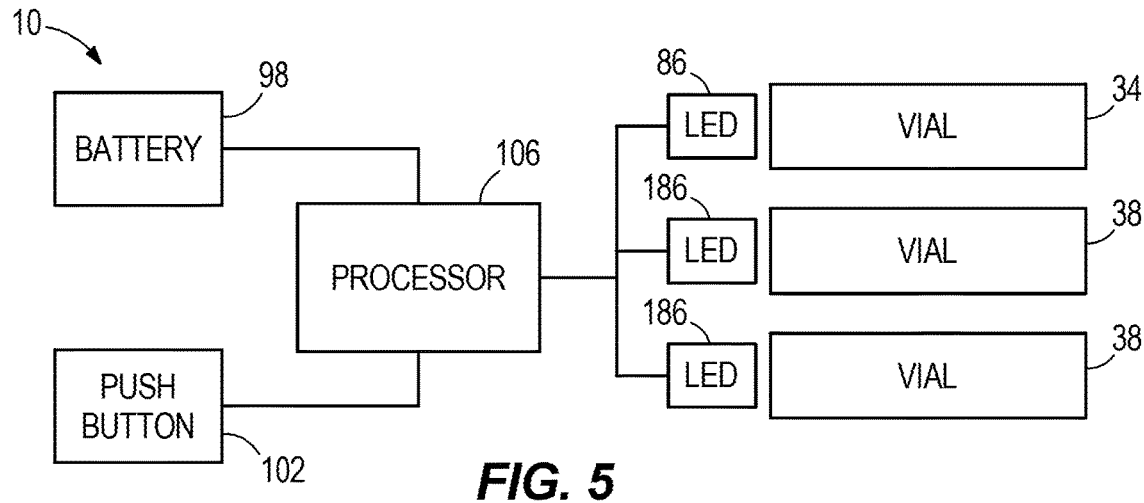
FIG. 5 is a schematic block diagram of the level of FIG. 1.

Referring back to FIG. 3 and with reference to FIG. 5, the level 10 also includes a power source 98, and a push button 102 (i.e., power switch). The power source 96 and the push button 102 are supported by the pair of webs 14 of the frame 12 of the level 10. In the illustrated embodiment, the power source 98 is a battery, or a plurality of batteries as shown in the illustrated embodiment. The batteries 98 may be standard AA or AAA (or any other type of battery, e.g., lithium cell) batteries that are removable and replaceable. In other embodiments, the batteries 98 may be a rechargeable battery (or batteries) that is integrated into the level 10. As shown in FIG. 5, the level 10 further includes a controller or processor 106 (e.g., a PCB). The push button 102 and the LEDs 86, 186 are coupled to the processor 106. Actuating the push button 102 a first time switches to a first lighting configuration, in which the LEDs 86 corresponding to the vial 34 of the horizontal vial assembly 26 are switched on, thereby illuminating only the vial 34 of the horizontal vial assembly 26. Actuating the push button 102 a second time switches to a second lighting configuration, in which the LEDs 86 are switched off and the LEDs 186 corresponding to the vials 38 of the vertical vial assembly 30 are switched on, such that only the vials 38 of the vertical vial assembly 30 are illuminated. In some embodiments, actuating the push button 102 a third time switches back to the first lighting configuration, while in other embodiments all of the LEDs 86, 186 are switched off or on. In some embodiments, pressing and holding the push button 102 down in a depressed position for a predetermined amount of time switches off all of the LEDs 86, 186. The processor 106 further includes a timer to turn off all of the LEDs 86, 186 automatically after a set period of time expires (e.g., about 1 minute, about 2 minutes, or about 3 minutes). It should be understood that although the invention has been described such that the LEDs 86, 186 emit UV light, in alternate embodiments the LEDs 86, 186 may emit visible light or any other type of light.

Figure 6:
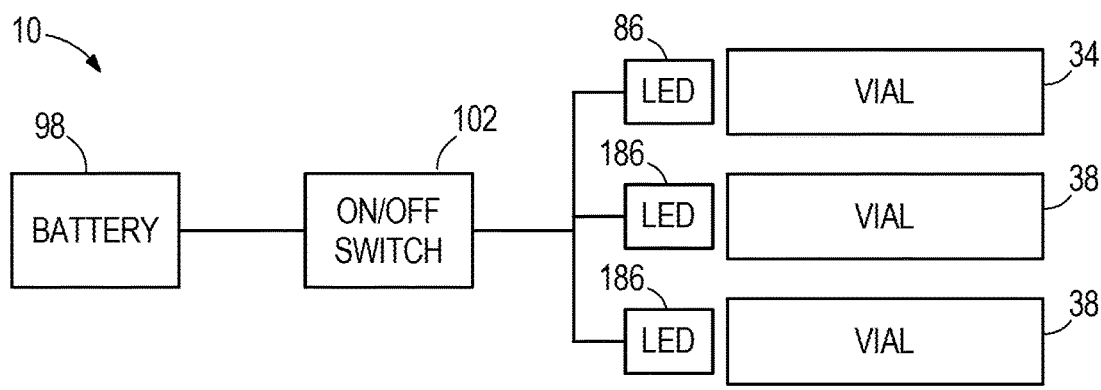
FIG. 6 is a schematic block diagram of the level of FIG. 1 according to another configuration.

FIG. 6 illustrates an alternative configuration of the level 10. The push button 102 is a power switch (i.e., on/off switch) electrically coupled between the battery 98 and the LEDS 86, 186. The switch 102 is actuated by a user to selectively turn all of the LEDS 86, 186 on and off to illuminate the vials 34, 38. In further alternative embodiments, the power switch 102 may be actuated to turn the LEDS 86, 186 on for a set period of time (e.g., about 1 minute, about 2 minutes, or about 3 minutes). In such embodiments, the LEDS 86, 186 may automatically turn off after the set period of time expires.

Figure 7:
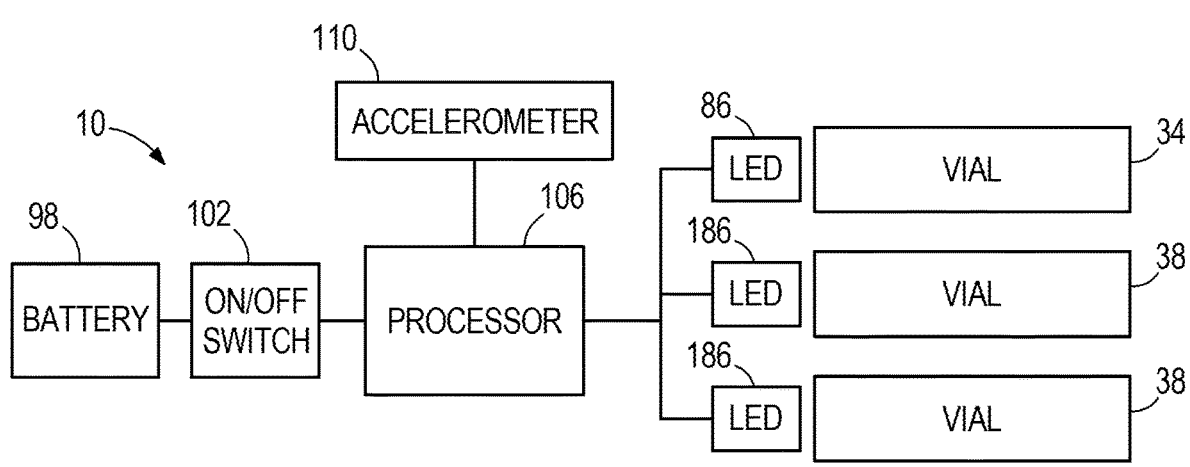
FIG. 7 is a schematic block diagram of the level of FIG. 1 according to yet another configuration.

FIG. 7 illustrates another alternative configuration of the level 10. The illustrated level 10 further includes an orientation or position sensor 110. The processor 106 is coupled to the LEDs 86, 186 and the position sensor 110. The position sensor 110 is operable to determine an orientation of the level 110 relative to a reference axis (e.g., gravity or true horizontal). In the illustrated embodiment, the position sensor 110 is an accelerometer. In other embodiments, other suitable position sensors may also or alternatively be employed. The processor 106 is configured, such that depending on the detected orientation of the level 10, the processor 106 selectively powers the LEDs 86, 186. For example, when the level 10 is orientated generally horizontally, the processor 106 may turn on the LEDs 86 corresponding to the 0-degree vial 34 of the horizontal vial assembly 26. Alternatively, when the level 10 is oriented generally vertically, the processor 106 may turn on the LEDs 186 corresponding to the 90-degree vials 38 of the vertical vial assemblies 30. In alternate embodiments, when the level 10 is orientated at an oblique angle, the processor 106 may turn on LEDs corresponding to a 30-degree vial, a 45-degree vial, and/or a 60-degree vial.

Figure 8:
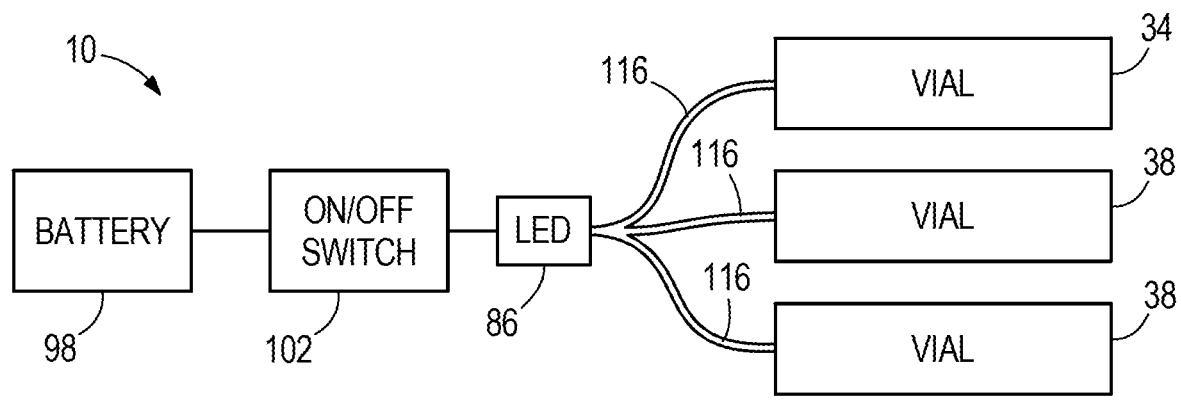
FIG. 8 is a schematic block diagram of the level of FIG. 1 according to still yet another configuration.

FIG. 8 illustrates yet another alternative configuration of the level 10. In this configuration of the level 10, the level 10 includes a single light source or LED 86 and light pipes 116 extending between the LED 86 and the vials 34, 38. The light pipes 116 guide UV light from the LED 86 toward the vials 34, 38 to selectively illuminate the vials 34, 38. In alternative embodiments, the level 10 may include additional light pipes extending between the LED 86 and the vials 34, 38 such that both ends of the vials 34, 38 are illuminated, as shown in FIG. 12. In some embodiments, the light pipes 116 may be channels formed in the web of the level 210. In other embodiments, the light pipes 116 may be tubes, cables (fiber optic), or fibers that are supported within or by the frame 12 of the level 10. Although only one LED 86 is shown communicating with all of the vials 34, 38 in some embodiments, an LED array may be used to illuminate the vials 34, 38. Additionally or alternatively, the level 10 may include multiple LEDs (or LED arrays) that each illuminate multiple vials (e.g., a first LED that illuminates the vials 38 of the vertical vial assemblies 30 and a second LED that illuminates the vial 34 of the horizontal vial assembly 26) through light pipes.

FIGS. 13-24 illustrate various vials having various constructions to increase visibility, accuracy and readability. The vials of FIGS. 15-24 may be configured with the level 10 in place of the vials 34, 38. The vials of FIGS. 13-24 may be configured with the level 10 and corresponding reference surfaces (i.e., top planar surface 18, and bottom planar surface 22) of the level 10, such that the vials are oriented to determine if a surface is plumb (i.e., vertical), level (i.e., horizontal), or oriented at any other desired reference angle. The vials of FIGS. 13-24 may be formed from glass, a clear polymer (e.g., acrylic), plastic, or another suitable material. Alternatively, the vials may be configured with any other suitable tool, device, or structure.

Figure 13:
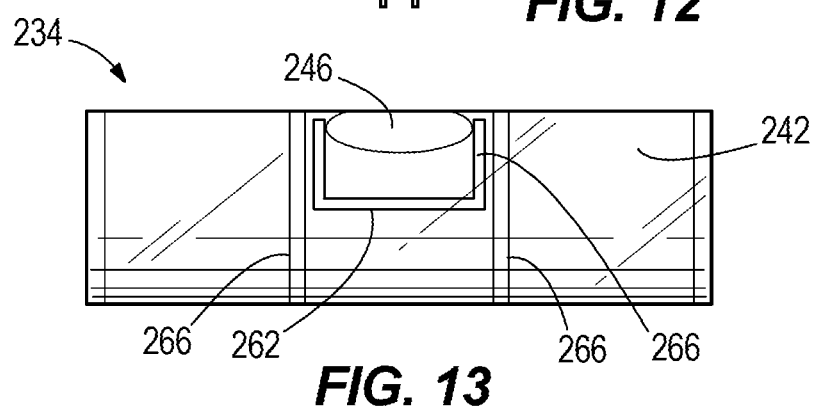
FIG. 13 illustrates a vial including an insert.

FIG. 13 illustrates another construction of a vial 234 for use with a level. Similar to the vials 34, 38 discussed above, the vial 234 includes a liquid 242, a bubble 246, and markings 250. The illustrated vial 234 further includes an insert 262 positioned within the liquid 242. The insert 262 includes two legs 266. The bubble 246 is captured between the legs 266 so that the insert 262 moves with the bubble 246 relative to the markings 250. The legs 266 provide very distinct lines indicating ends of the bubble 246 relative to the markings 250. In the illustrated embodiment, the legs 266 are translucent or transparent so that light can pass through the legs 266 from one end of the vial 234 to the other end of the vial 234. In some embodiments, the legs 266 may also or alternatively be colored. Additionally or alternatively, the legs 266 may include a UV sensitive component embedded in or coated on the legs 266 so that the legs 266 glow when exposed to UV light. In such an embodiment the UV light may be emitted by LEDs, as described above.

Figure 14:
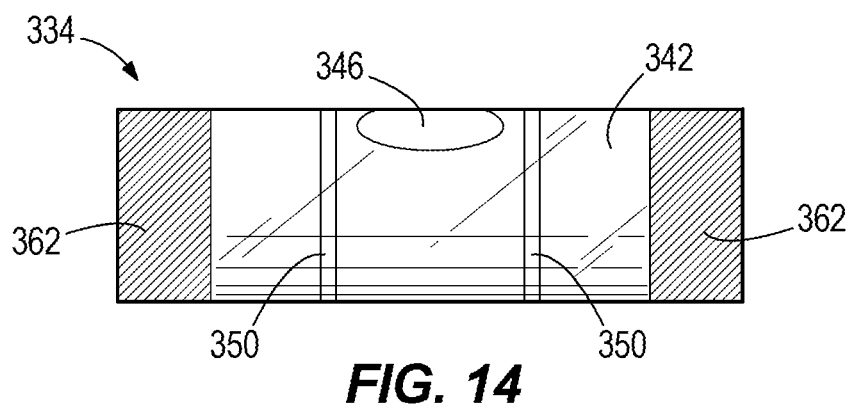
FIG. 14 illustrates a vial including reflective strips.

FIG. 14 illustrates another construction of a vial 334 for use with a level. Similar to the vials 34, 38 discussed above, the vial 334 includes a liquid 342, a bubble 346, and markings 458. The illustrated vial 334 further includes reflective strips 362. The reflective strips 362 wrap around portions of the vial 334. In the illustrated embodiment, the reflective strips 362 wrap around portions of the vial 334 adjacent ends of the vial 334 so that the strips 362 do not interfere with the markings 350. The strips 362 could be located inside or outside of the vial 334. Each reflective strip 362 includes an inner surface (i.e., the surface facing into the vial 334) that is white or made of a reflective color or material. The inner surface reflects lights from a light source (e.g., LEDs) to increase the intensity of the light within the vial 334. In some embodiments, the inner surface of the strips 362 may include a UV sensitive component that glows when exposed to UV light. Additionally or alternatively, outer surfaces (i.e., the surfaces facing away from the vial 334) of the strips 362 may be darkened so that the strips 334 do not distract a user.

Figure 15:
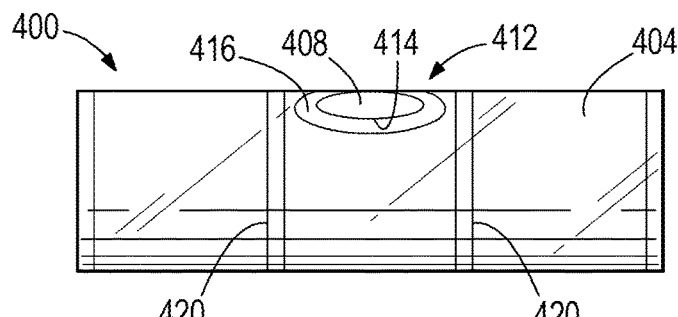
FIG. 15 is a side view illustrating a vial having a bubble with improved visibility.

FIG. 15 illustrates another construction of a vial 400 for use with a level. The vial 400 includes an interior cavity that holds a first and second constituent. The first constituent is a first fluid 404 (e.g., alcohol, mineral spirit, etc.) and the second constituent is a second fluid 408 (e.g., air, liquid, etc.). The first fluid 404 and the second fluid 408 are relatively immiscible. The second fluid 408 is suspended in the first fluid 404 forming a globule or bubble 412 to act as an inclination indicator. The first fluid 404 and the second fluid 408 define an interface 414 between exterior surfaces of the second fluid 408 and the first fluid 404. The vial 400 further includes a third constituent or material 416 that is attracted to and collects on the exterior surface of the second fluid 408. The third material 416 may be a third fluid immiscible with the first and second fluids 404, 408, a particulate, or any other suitable material that is attracted to the second fluid 408 and not the first fluid 404, or alternatively repelled by the first fluid 104. The third material 416 may partially or entirely surround the bubble 412, in other words the third material 416 may partially or entirely enclose the exterior surface of the bubble, and may have various thicknesses. The third material 416 accentuates the peripheral boundaries of the bubble 412 to provide improved visibility of the bubble 412 within the vial 400, and improved readability of the position of the bubble 412 relative to a pair of marking lines 420 of the vial 400. In one embodiment, the third material 416 may be UV sensitive such that the third material 416 glows or illuminates when exposed to UV sensitive light. In another embodiment, the first fluid 404, the second fluid 408, and the third material 416 may be oil, water, and soap (e.g., dish soap), respectively. In another embodiment, when the third material 416 becomes separated from the surface of the bubble 412 (e.g., by dropping the level, shaking, agitation, etc.), the third material 416 is configured to return to the surface of the bubble 412 in a predetermined amount of time (e.g., in less than about 3 seconds, in another embodiment, in less than about 2 seconds, in another embodiment, in less than about 1 second, in another embodiment, in less than about 0.5 seconds).

Figure 16:
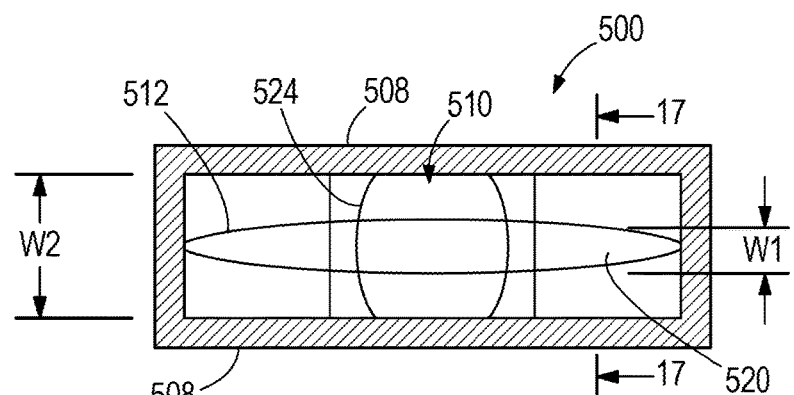
FIG. 16 is a top planar view illustrating a flat vial.
Figure 17:
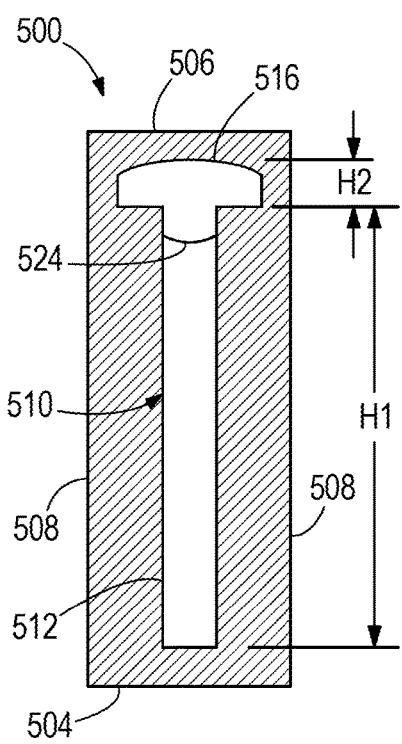
FIG. 17 is a cross-sectional view of the flat vial of FIG. 16 taken along line 17-17.
Figure 18:
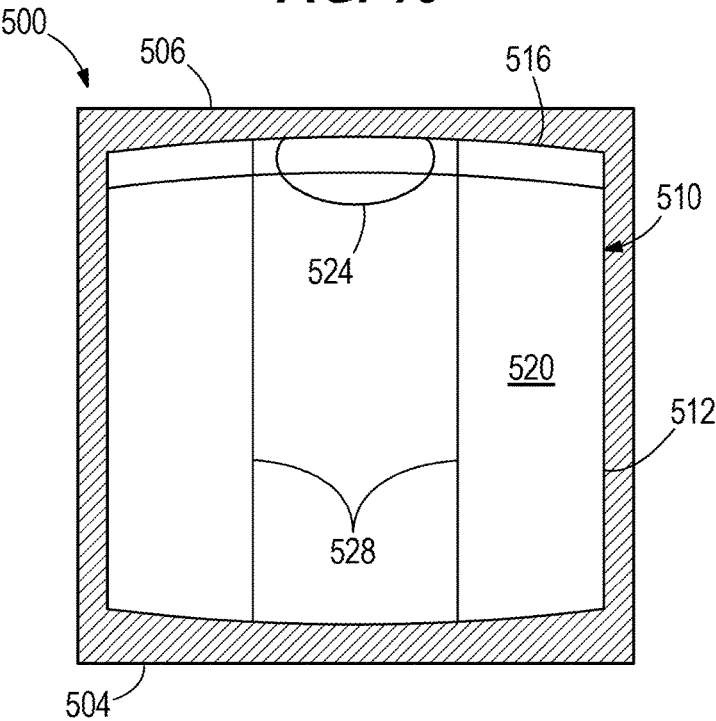
FIG. 18 is a side view of the flat vial of FIG. 16.

FIGS. 16-18 illustrate a flat vial 500 for use with a level. The flat vial 500 includes a transparent elongated block 502 that has a bottom side 504, a top side 506 and a pair of vertical sides 508. The block 502 defines a T-shaped interior cavity 510, as shown in FIG. 17. In addition, similar to the vial 34 as discussed above the cavity 510 is filled with a first fluid 520 and an air bubble 524, or immiscible second fluid, to act as an inclination indicator. The T-shaped interior cavity 510 has a first, vertical portion 512 parallel with the vertical sides 508, and a second, horizontal portion 516 parallel with the top side 506. With reference to FIG. 16, the second portion 516 has a width W2 that is significantly wider than a width W1 of the first portion 512. In addition, with reference to FIG. 17, the second portion 516 has a height H2 significantly less than a height H1 of the first portion 512 (e.g., the height H2 of the second portion 516 may be less than 1/16th of an inch, i.e., less than approximately 1.5 mm). Thus, the visibility of the second portion 516 is minimized when viewing the bubble 524 from either of the vertical sides 508. In some embodiments, the third material 416 of the vial 400 of FIG. 15 may be used to provide further visibility of the bubble 524 of the vial 500 of FIGS. 16-18, as described above with respect to vial 400 of FIG. 15. In addition, the first portion 512 and the second portion 516 both have a concave barrel shape so that the bubble 524 settles toward the center of the second portion 516 when the flat vial 500 is horizontal.

In use, the vial 500 of FIGS. 16-18 provides enhanced visibility by forcing the bubble 524 to appear larger in the views where it typically appears small. For example, from either of the vertical sides 508 (FIG. 18) the bubble 524 is seen extending horizontally across the first portion 512 of the cavity 508 providing for increased visibility of the bubble 524. When viewing the vial 500 from the top side 506 (FIG. 16) a portion of the bubble may be located in the second portion 516 such that the bubble 524 may be seen extending across the second portion 516 of the cavity 508, which may provide for increased visibility of the bubble 524 based on the greater dimension of the width W2 of the second portion 516 compared to that of the width W1 of the first portion 512 (i.e., compared to a flat vial without a second portion 516). Thus, the second portion 516 provides improved visibility of the bubble 524 and readability of the position of the bubble 524 relative to a pair of indicator lines 528, when viewing the bubble 524 from the top side 506, as shown in FIG. 16. Without the second portion 516 the bubble 524 would be as thin as the width W1 of the first portion 512. Thus, the bubble 524 would be difficult to see and read when viewing from the top side 506.

Figure 19:
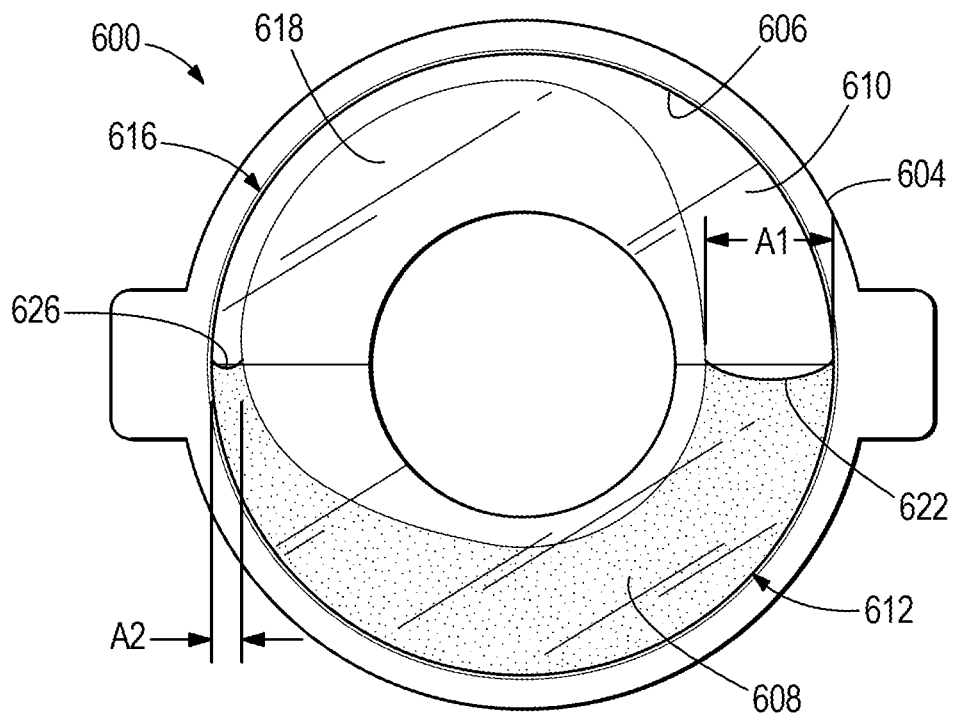
FIG. 19 is a side view illustrating an annular vial in a first orientation.
Figure 20:
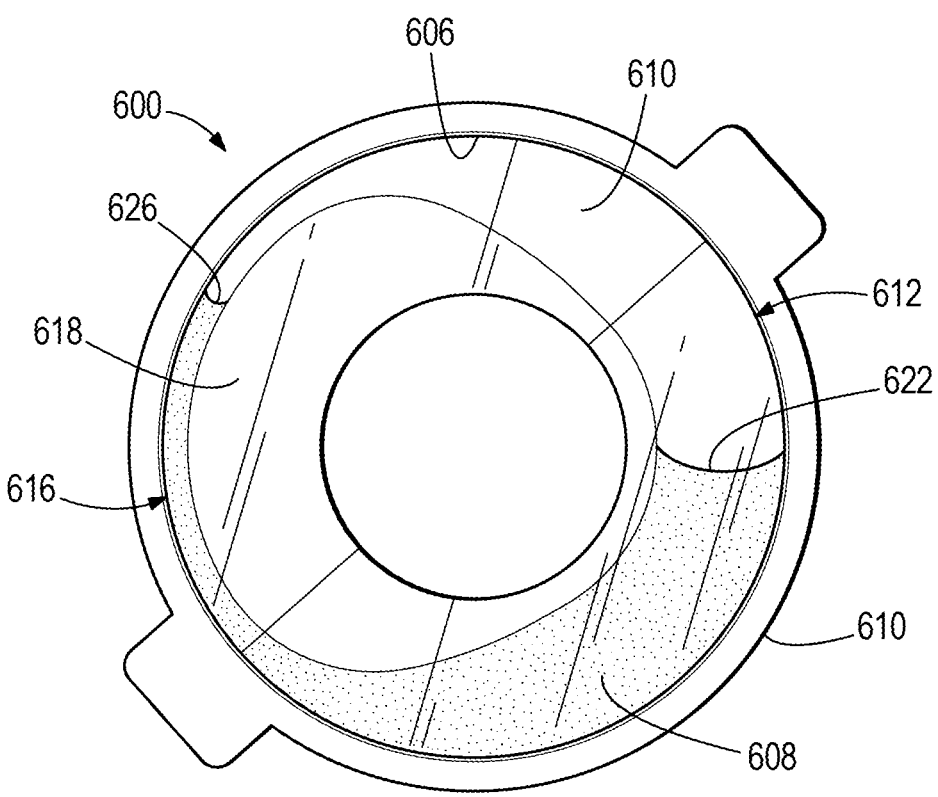
FIG. 20 is a side perspective view of the annular vial of FIG. 5 in a second orientation.

FIGS. 19-20 illustrate an annular vial 600 for use with a level. The annular vial 600 including a disc-shaped body 604. The body 604 defines an annular interior cavity 606 with a varying cross-sectional area. The interior cavity 606 contains a first fluid 608 and air 610, or alternatively a second fluid being immiscible with the first fluid 608, similar to the vial 400 of FIG. 15 as discussed above. The interior cavity 606 has a first portion 612 and a second portion 616 opposite the first portion 612. The first portion 612 has a first width A1 defining a first cross-sectional area and the second portion 616 has a second width A2 defining a second cross-sectional area. The annular vial 600 further has a central solid portion 618 positioned centrally within the interior cavity 606 and extending asymmetrically into the first and second portions 612, 616. The solid portion 618 extends further into the second portion 616 of the cavity 606 than the first portion 612, such that the first width A1 is wider than the second width A2. Due to the depth (i.e., dimension perpendicular to FIGS. 19-20) of the cavity 606 being uniform, the first cross-sectional area is greater than the second cross-sectional area. As such, the first portion 612 has a larger volume than the second portion 616. Due to the difference in volume between the first portion 612 and the second portion 616, tilting the annular vial 600 from a first position, shown in FIG. 19, to a second position, shown in FIG. 20, displaces the fluid 608 from the first portion 612 to the second portion 616 causing a small change in the amount of fluid 608 that occupies the first portion 612 (as a function of the total amount of fluid in the first portion 612) while causing a large change in the amount of fluid 608 that occupies the second portion 616 (as a function of the total amount of fluid in the second portion 616), as shown in FIG. 20. In other words, a small change in the height of a meniscus 622, or fluid level, (i.e., area where the first fluid 608 and the air 610 are in contact) of the fluid 608 in the first portion 612 causes a large change in height of a meniscus 626 of the fluid 608 in the second portion 616 as fluid 608 is forced through the second portion 616. Thus, small angular changes of the annular vial 600 have increased perceptibility and readability due to the large change in the height of the fluid in the second portion 616 of the cavity 606. As such, a surface can be more accurately measured for level or plumb using the annular vial 600. In some embodiments the depth (i.e., the dimension perpendicular to FIG. 19) of the cavity may be larger in the first portion 612 than in the second portion 616 to provide a larger difference in volume between the first portion 612 and the second portion 616 and cause a larger change in height of the fluid 608 in the second portion 616.

The annular vial 600 may include indicator marks (not shown) positioned circumferentially around the annular vial 600 that are calibrated with the amount of the fluid 608 within the cavity 606 to indicate when the vial 600 is level (i.e., horizontal). Alternatively, the indicator marks may be located around the vial 600 on vial surrounds or a level supporting the vial 300. Additionally, because of the continuous annular cavity 606 the annular vial 600 may be used as both a level vial and a plumb vial to determine horizontal or vertical without the need to reorient the vial or use a separate vial.

FIGS. 21-22 illustrate a vial 700 for use with a level. The vial 700 includes a body 704 defining an interior cavity 708. The interior cavity 708 has a first portion 710 that contains a first fluid 712 and a second portion 714 that contains air 716, or alternatively an immiscible second fluid, when the vial 700 is horizontal, as shown in FIG. 21. The first fluid 712 defines a fluid level 720. The vial 700 further includes a reference line 722 to indicate that the vial 700 is horizontal when the fluid level 720 is aligned or parallel with the reference line 722, as shown in FIG. 21. The vial further includes a plurality of spaced obstructions 724 that define a plurality of narrow channels 728 between the obstructions 724. The narrow channels 728 fluidly connect the first portion 710 and the second portion 714 of the cavity 708. The obstructions 724 reduce the cross-sectional area, and thus volume, between the first portion 410 and the second portion 714 to that of the narrow channels 728. Thus, as the vial 700 is tilted the first fluid 712 moves upwardly through the narrow channels 728 such that a height H3 between the fluid level 720 and the reference line 722 is increased, as shown in FIG. 22. Due to the narrow channels 728 the visibility of the fluid level 720 and readability of the vial 700 is increased. As such, a user can more readily and accurately determine if the fluid level 420 is aligned with the reference line 722, and therefore more accurately determine if a measured surface is level or plumb.

Figure 23:
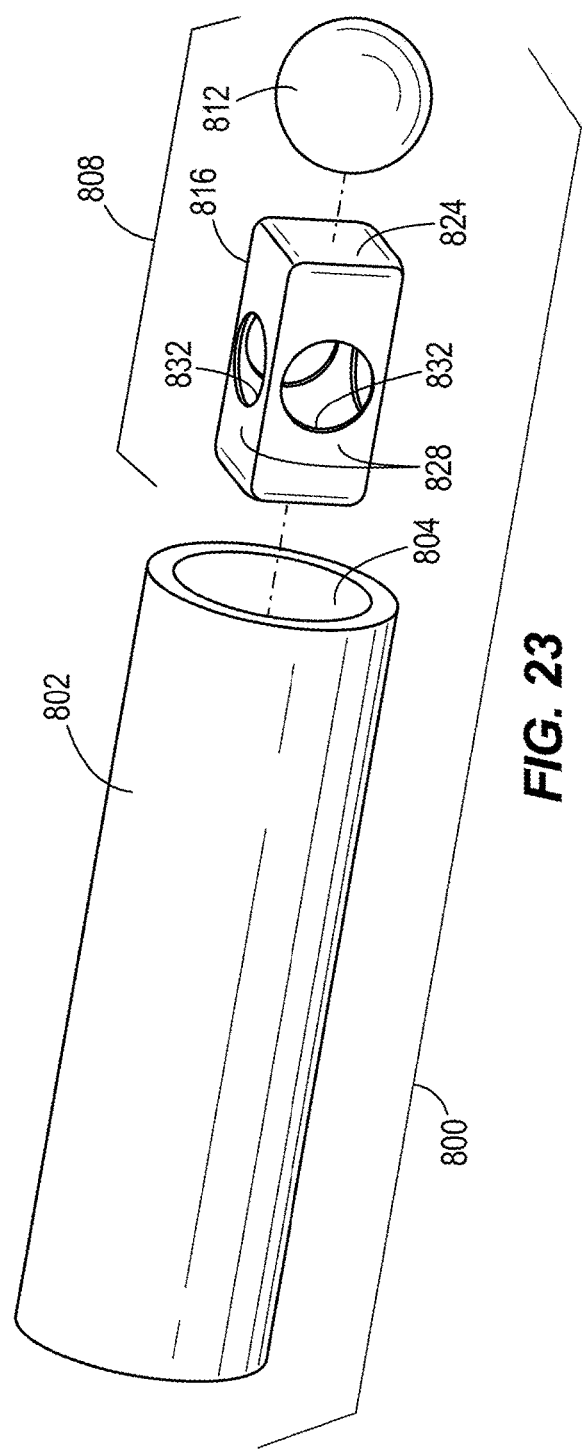
FIG. 23 is an exploded view of a vial including a solid indicator.
Figure 24:
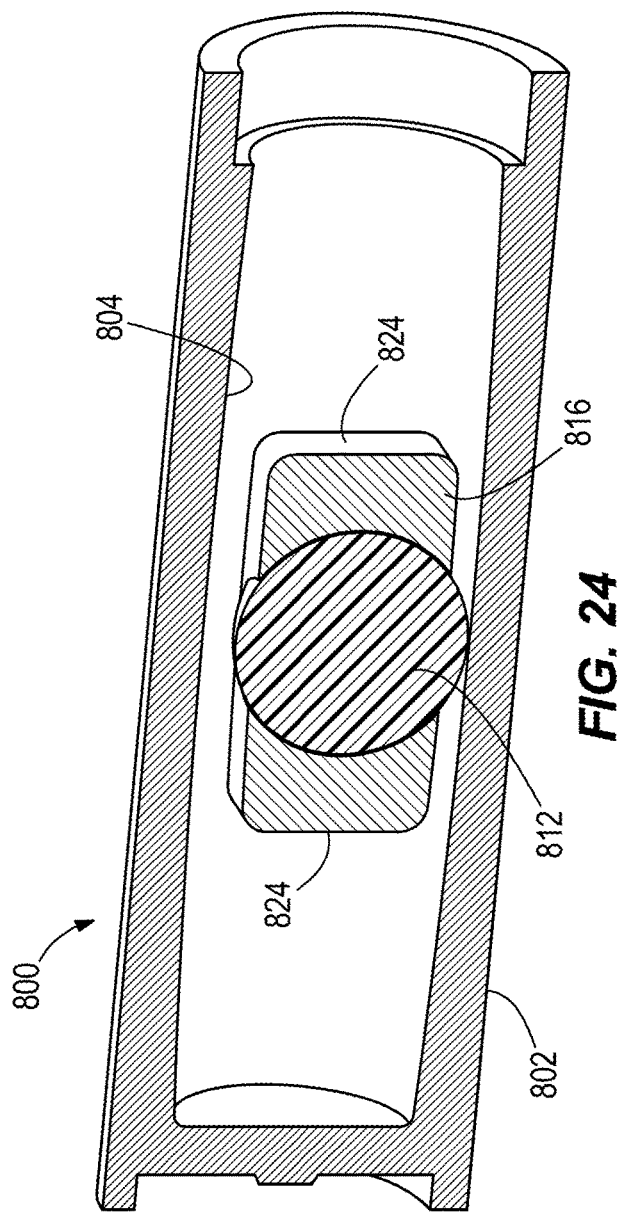
FIG. 24 is a cross-sectional perspective view of the vial of FIG. 23.

FIGS. 23-24 illustrate a vial 800 for use with a level. The vial 800 includes a transparent cylindrical body 802 having an inner bore 804 configured to hold a first constituent. In the illustrated embodiment, the first constituent is a fluid (e.g., alcohol, mineral spirits, etc.). A solid "bubble" or indicator 808 is suspended in the fluid. The solid indicator 808 includes a second constituent and a third constituent. The second constituent is a sphere 812 and the third constituent is an outer surround 816 that is fitted over the sphere 812. The solid indicator 808 replaces the air bubble of standard spirit level tools. The outer surround 816 is a cuboid that has a pair of opposite end faces 824 and four longitudinal faces 828 extending between the end faces 824. Each of the longitudinal faces 828 defines a circular window 832. The sphere 812 is formed from a dense material (e.g., metal, hard plastic, etc.) and is solid, although in some embodiments a hollow sphere may be employed.

As shown in FIG. 24, the sphere 812 is positioned within the cuboid 816 such that the sphere 812 is partially enclosed by the cuboid 816. The sphere 812 protrudes partially out of the circular windows 832. The sphere 812 rotates freely within the cuboid 816 such that the sphere 812 can roll along an inner surface of the bore 804, thereby allowing the indicator 808 to move axially within the cylindrical body 802 of the vial 800. As the vial 800 is tilted with respect to the axis being measured the indicator 808 moves toward the lower end of the vial 800. The inner surface of the bore 804 has a concave or barrel shape that allows for the indicator 808 to settle toward the center of the bore 804 when the vial 800 is parallel to the axis being measured. In use, similar to levels that use air bubbles, a surface is indicated as level or plumb, when the indicator 808 falls between a pair of indicator marks or lines on the body 802. The end faces 824 are parallel with the indicator lines on the cylindrical body 802 of the vial 800. Thus, the distance between the end faces 824 and the corresponding indicator line may be easily determined, increasing readability in comparison to a sphere 812 or bubble. In addition, the color of the cuboid 820 and the material used to manufacture the cuboid 820 can be selected to assure that the cuboid 820 stands out and is easily visible in common or desired lighting circumstances. Therefore, the cuboid 820 provides increased visibility and accuracy to the indicator 808 within the vial 800. In alternative embodiments, one or both of the sphere 812 and the cuboid 820 may include a UV sensitive component that glows when exposed to UV light, as described above.

FIGS. 25-28 illustrate a digital level 910 for determining whether an object or surface is level relative to true horizontal or adjusting an object or surface to be a level surface relative to true horizontal. The level 910 may be used to measure and level at different angles, e.g., 0 degrees, and 90 degrees. In alternate embodiments the level 910 may be used to measure and level at additional angles, e.g., 30 degrees, and 45 degrees. In further alternate embodiments the level 910 may be used to measure and level at all angles between 0 and 90 degrees. It should be readily apparent that the level 910 may be used by a variety of users and skilled technicians to perform a variety of leveling functions.

Figure 25:
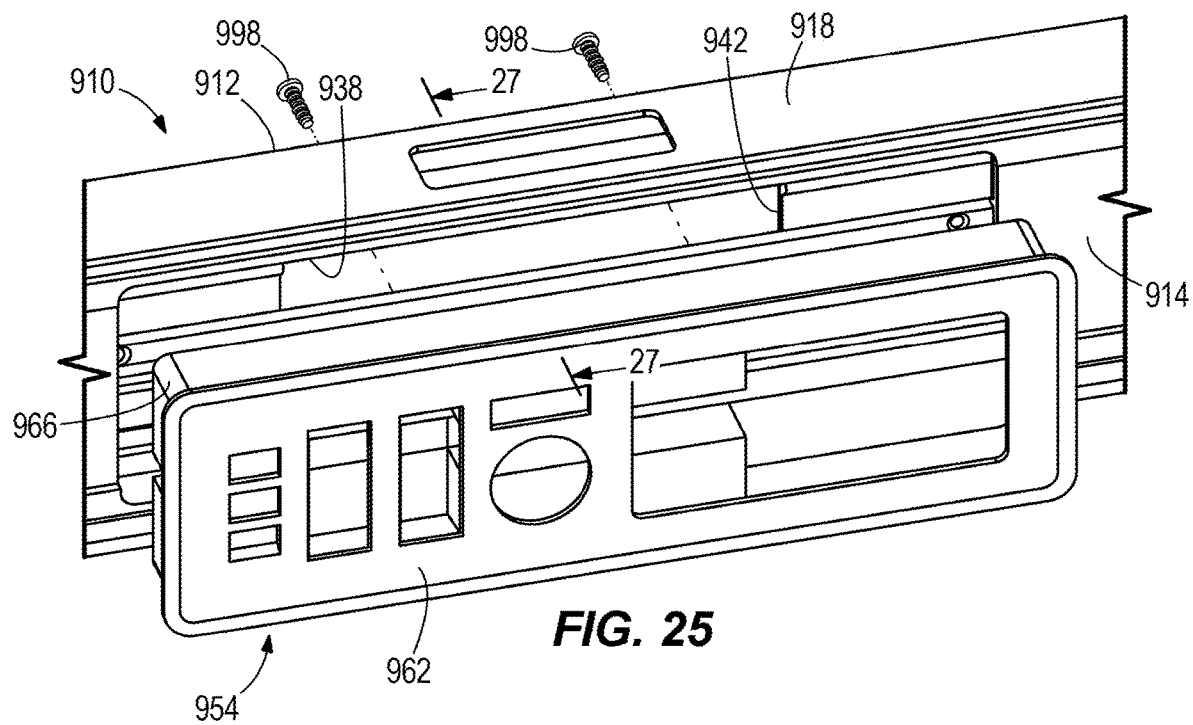
FIG. 25 is an enlarged partially exploded perspective view of a digital level.
Figure 27:
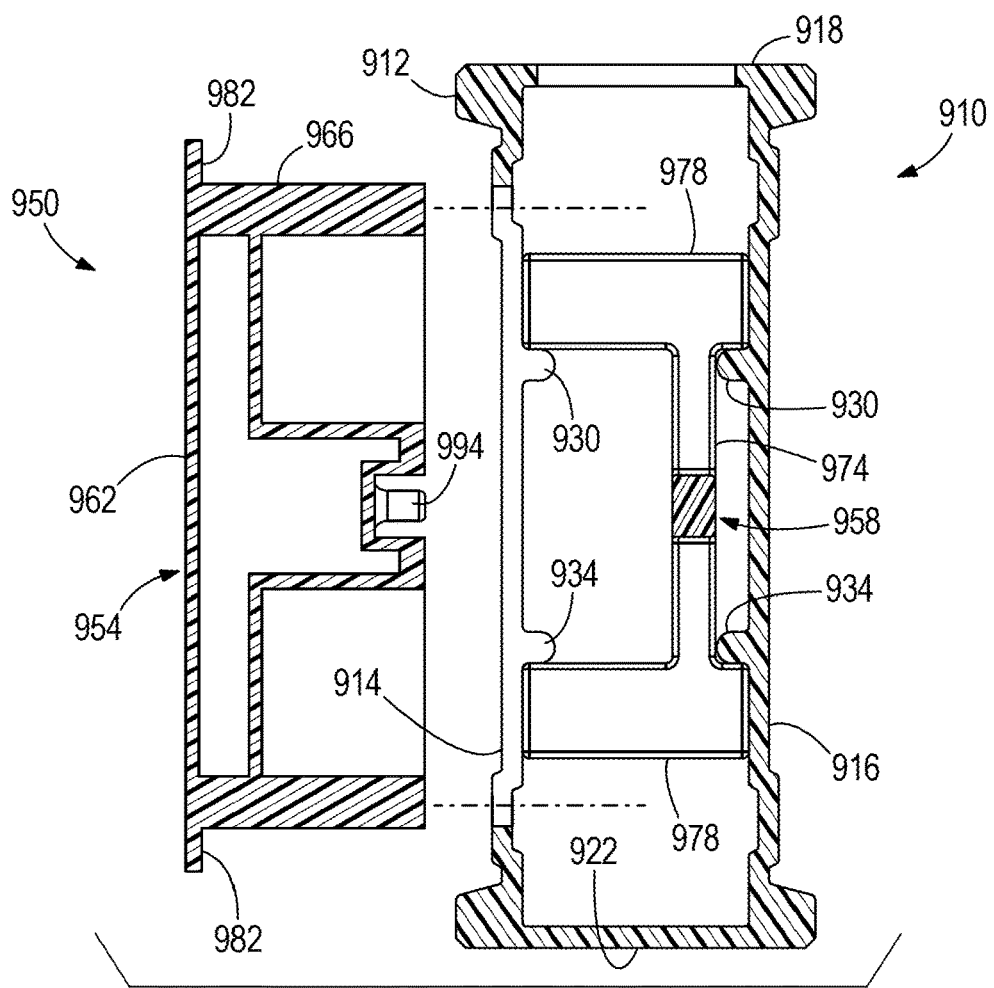
FIG. 27 is a partially exploded end view of the digital level of FIG. 25.

With reference to FIG. 27, in the illustrated embodiment, the level 910 is a box type level and has a frame 912 that includes a front web 914 and a back web 916 coupled to each of a top planar surface 918, and a bottom planar surface 922. The front and back webs 914, 916 are spaced apart and substantially parallel. The top planar surface 918 is spaced apart from and substantially parallel to the bottom planar surface 922. The pair of parallel webs 914, top planar surface 918, and the bottom planar surface 922, define a hollow box-shaped interior of the level 910. A pair of top ribs 930 and a pair of bottom ribs 934 protrude inwardly from the front and back webs 914, 916. The ribs 930, 934 extend longitudinally along the length of the frame 912 parallel to the top and bottom planar surfaces 918, 922. The front web 914 defines a front opening 938 and the back web 916 defines a back opening 942, as shown in FIG. 25. A battery compartment door (not shown) is configured to removably cover the back opening 942.

Figure 26:
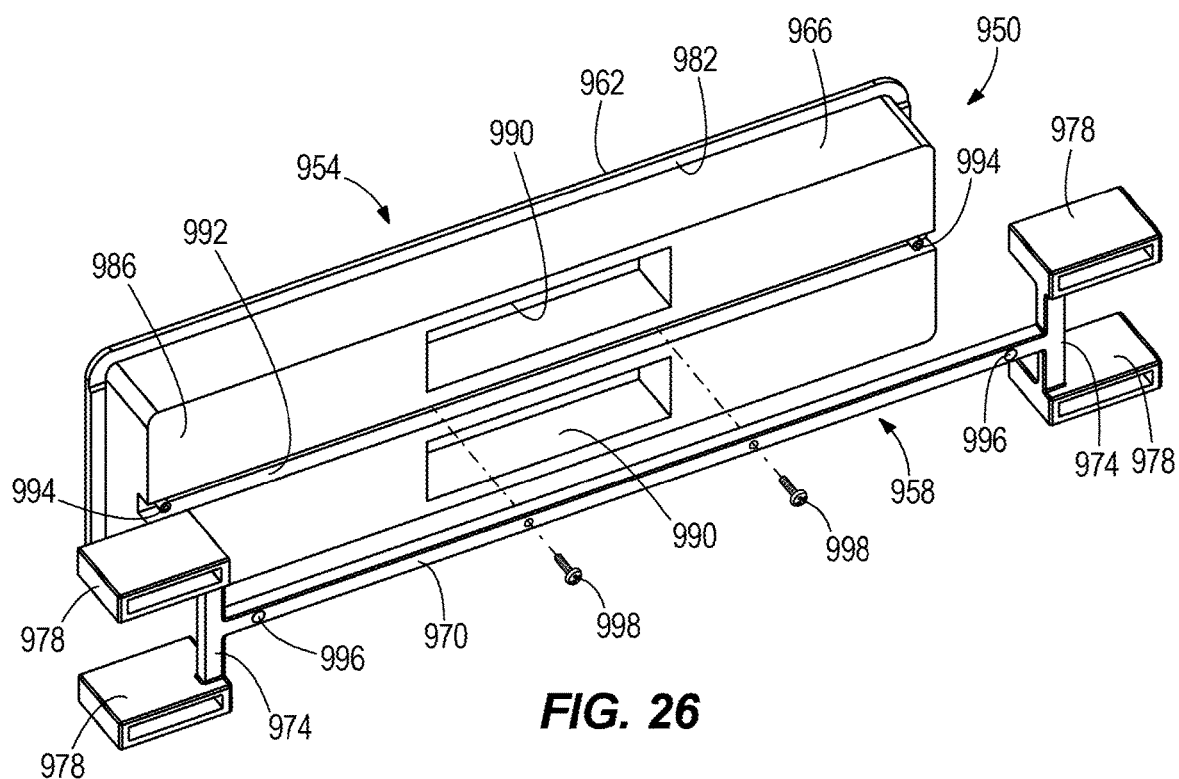
FIG. 26 is an exploded view of an electronic case mounting assembly of the digital level of FIG. 25.

With reference to FIGS. 25-26, the digital level 910 further includes an electronics case assembly 950 that includes an electronics case 954 and a crossbar 958. The electronics case 954 includes a front face plate 962 and a back portion 966 that supports electronics such as a controller, a digital display, and controls (not shown). The digital display may be configured to display the orientation of the level 910, such as the angle from true vertical (i.e., gravity) or true horizontal (i.e., 90 degrees from gravity).

The crossbar 958 includes a horizontal portion 970 and vertical portions 974 that each extends perpendicularly from the opposite ends of the horizontal portion 970. A retaining portion 978 extends from each end of each of the vertical portions 974 and has a width approximately equal to the space defined between the front and back webs 914, 916. The crossbar 958 is received within the frame 912 by inserting the crossbar 958 into the interior of the frame 912 along the length of the level 910 such that two of the retaining portions 978 slide along the pair of top ribs 930 and the other two of the retaining portions 978 slide along the pair of bottom ribs 934, thereby supporting and aligning the crossbar 958 vertically within the interior of the frame 912, as shown in FIG. 27.

With regard to the electronics case 954, the front face plate 962 is coupled to the back portion 966 and extends beyond the perimeter of the back portion 966 so as to define a lip 982. The back portion 966 fits through the front opening 938 of the level 910, such that the lip 982 abuts the front web 914 around the front opening 938. The back portion 966 has a back surface 986 and defines a pair of battery compartments 990, and a channel 992. The channel 992 extends along a longitudinal center of the back surface 986 and receives the horizontal portion 970 of the crossbar 958 to align and support the electronics case 954 within the front opening 938. A pair of pins 994 is positioned within the channel 992. Each of the pins 994 is received by a pin aperture 996 in the horizontal portion 970 of the crossbar 958 to assist in aligning the crossbar 958 with the electronics case 954, once the electronics case 954 is fitted within the front opening 938.

Figure 28:
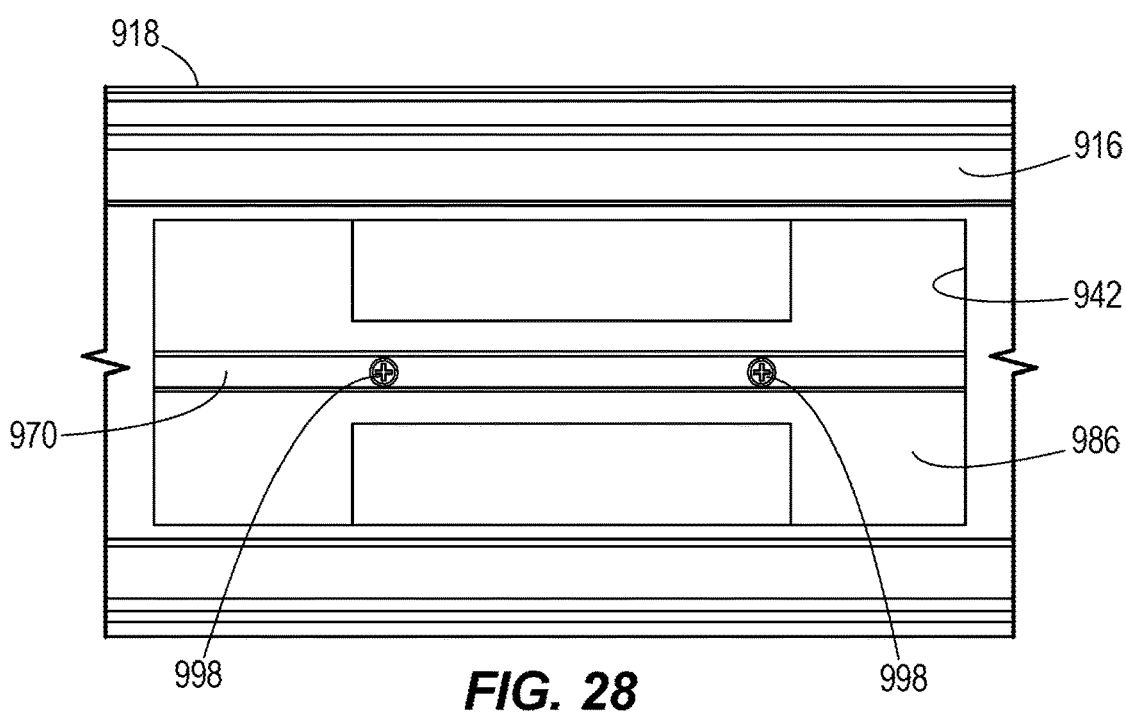
FIG. 28 is an enlarged back view of the digital level of FIG. 25.

With reference to FIGS. 26 and 28, the digital level 910 further includes a pair of fasteners 998 that couple the electronics case 954 to the crossbar 958. The fasteners 998 provide a clamping force between the lip 982 of the electronics case 954 and the crossbar 958 on the front web 914 of the frame 912 to hold the electronics case 954 to the frame 912. The fasteners 998 may be threaded screws, rivets, or another type of fastener. Alternatively, the electronics case 954 and the crossbar 958 may be coupled together by an adhesive (e.g., epoxy).

In order to assemble the digital level 910, one simply inserts the crossbar 958 longitudinally into the interior of the frame 912, such that the retaining portions 978 align the crossbar 958 and prevent the crossbar 958 from moving vertically. The crossbar 958 is slid along the ribs 930, 934 until the crossbar 958 is positioned adjacent the front and back openings 938, 942. The back portion 966 of the electronics case 954 is then inserted into the front opening 938, such that the channel 992 receives the horizontal portion 970 of the crossbar 958 and the pin apertures 996 receive the pins 994, thereby aligning the crossbar 958 with the electronics case 954. The lip 982 of the electronics case 954 abuts the front web 914. The fasteners 998 are then inserted through the back opening 942 (FIG. 28) and used to couple the crossbar 958 to the electronics case 954, and provide a clamping force between the lip 982 and the crossbar 958 to hold the electronics case 954 to the frame 912 within the front opening 938. Lastly, the back opening 942 is covered by the battery compartment door (not shown) to hide the fasteners 998 and inhibit contaminants from entering the interior of the frame 912.

Figure 29:
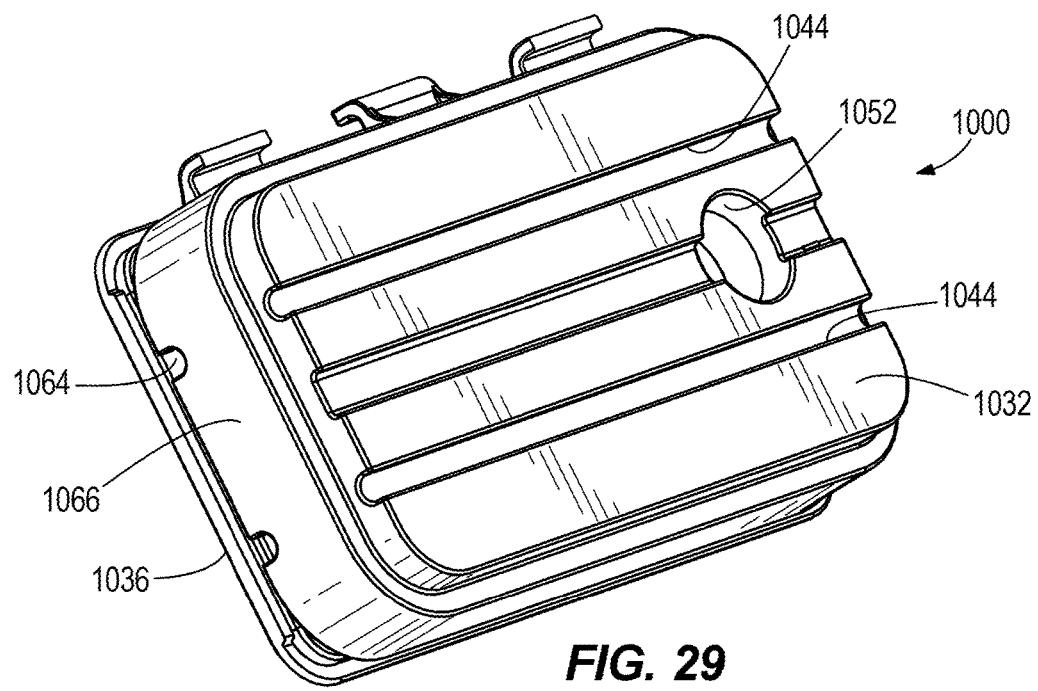
FIG. 29 is a perspective view of a battery compartment for a level.
Figure 30:
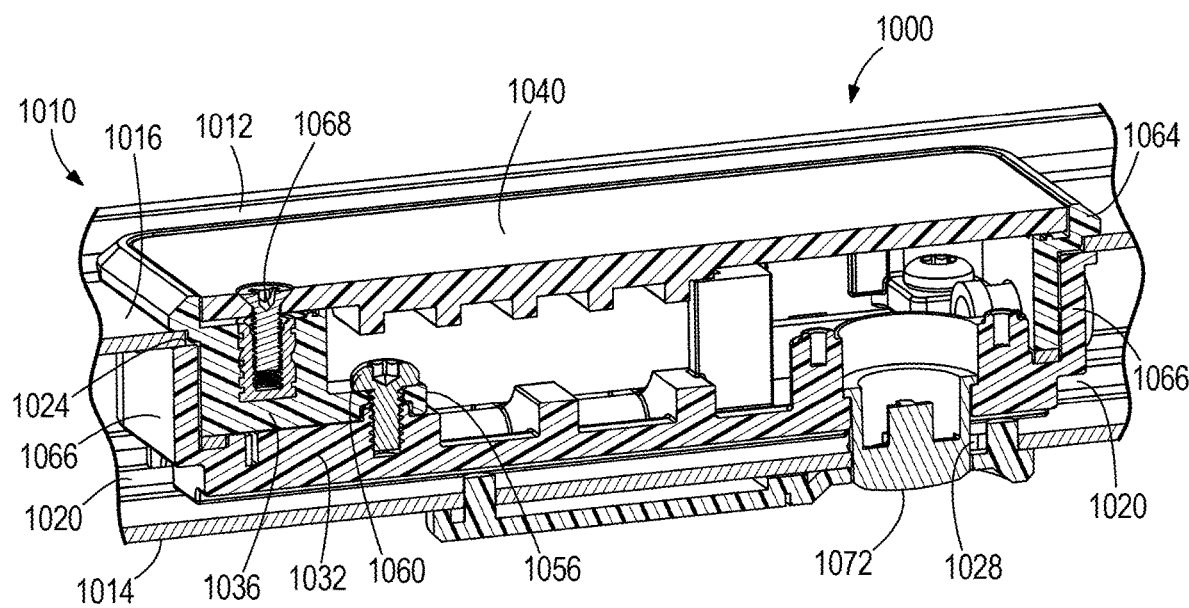
FIG. 30 is an enlarged cross-sectional perspective view of the battery compartment of FIG. 29, illustrating the battery case mounted within a level.
Figure 31:
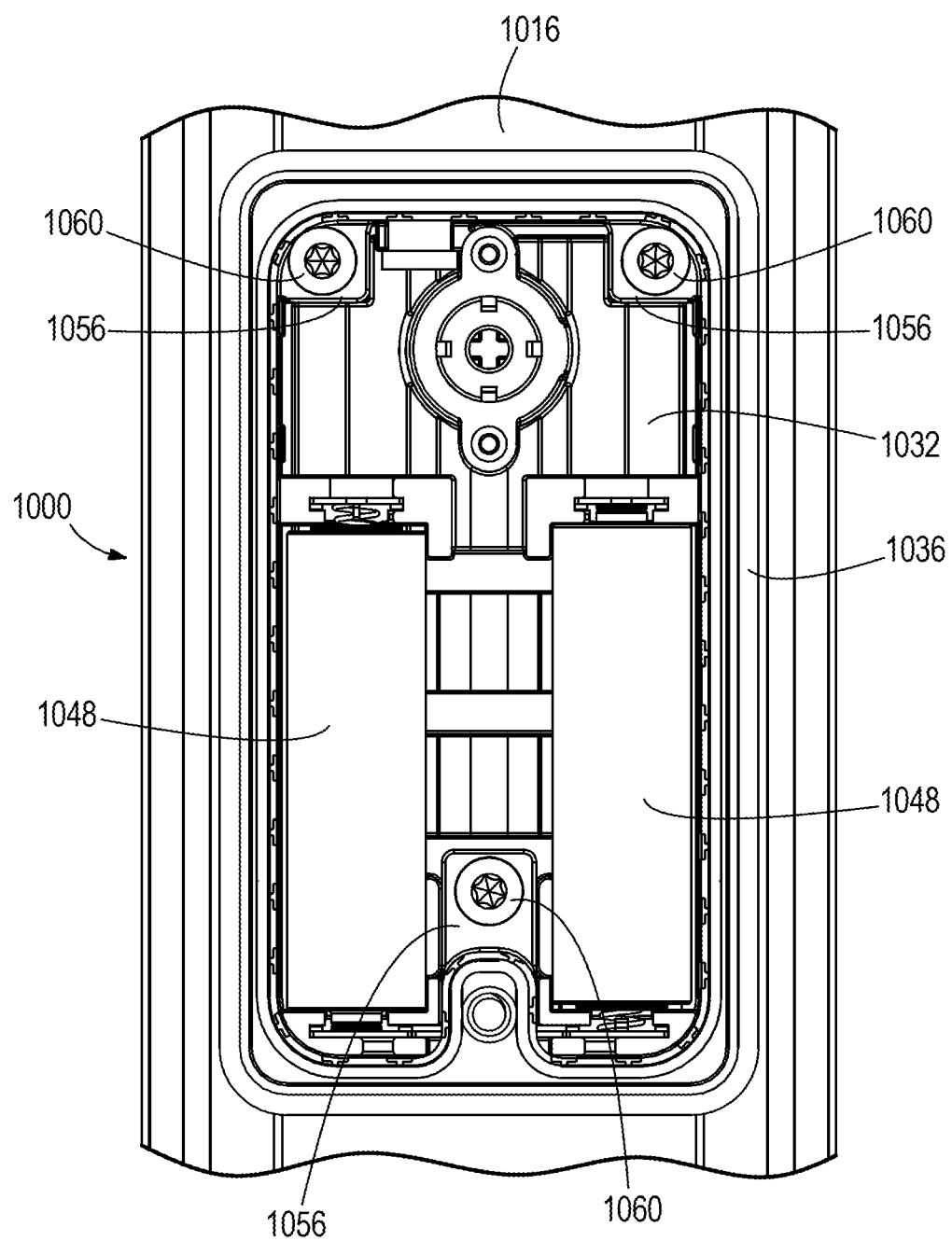
FIG. 31 is a top planar view of the battery compartment of FIG. 29, illustrating the battery compartment cover removed.

FIGS. 29-31 illustrate a battery case 1000 for use with a level 1010 that is similar to the level 910 of FIGS. 25-28. Specifically, with reference to FIG. 30, the level 1010 is a box type level and has a frame 1012 that includes a front web 1014 and a back web 1016 coupled to each of a top planar surface (not shown), and a bottom planar surface (not shown). The front and back webs 1014, 1016 are spaced apart and substantially parallel. The top planar surface is spaced apart from and substantially parallel to the bottom planar surface. The front and back webs 1014, the top planar surface, and the bottom planar surface, define a hollow box-shaped interior of the level 1010. A pair of ribs 1020 (only one is shown in FIG. 30) protrudes inwardly from the front web 1014. The ribs 1020 extend longitudinally along the length of the frame 1012 parallel to the top and bottom planar surfaces. The back web 1016 may also define another pair of ribs (not shown) that mirrors the ribs 1020 extending from the front web 1014. The back web 1016 defines a battery case opening 1024. The front web 1014 defines a push button opening 1028.

The battery case 1000 includes a first portion 1032, a second portion 1036, and a battery compartment cover 1040. The first portion 1032 defines a pair of channels 1044 that are spaced apart the same distance as the pair of ribs 1020 on the frame 1012. The first portion 1032 may be received within an open end (not shown) of the frame 1012 such that the channels 1044 receive the ribs 1020 of the frame 1012 to align the first portion 1032 to slide along the length of the frame 1012 on the ribs 1020. Alternatively, the first portion 1032 may be received within the battery case opening 1024 and aligned with the ribs 1020. The first portion 1032 and the second portion 1036 define a battery compartment for receiving batteries 1048. The first portion 1032 also defines an aperture 1052 for a push button 1072. The first portion 1032 is mounted and aligned within the frame 1012 so that that the aperture 1052 in the first portion 1032 aligns with the push button opening 1028 such that the push button 1072 extends through the push button opening 1028.

With reference to FIGS. 30-31, the second portion 1036 includes three tabs 1056 having openings that are aligned with corresponding threaded bores in the first portion 1032. Each of the openings in the tabs 1056 and the corresponding threaded bores in the first portion 1032 receive a threaded fastener 1060 to join the second portion 1036 to the first portion 1032. The second portion 1036 further includes a lip 1064 that extends around the perimeter of the battery case opening 1024. The lip 1064 of the second portion 1036 and an outer wall 1066 of the first portion clamp the back web 1016 around the perimeter of the battery case opening 1024, when the fasteners 1060 are tightened, thereby securing the battery case 1000 to the frame 1012 within the battery case opening 1024 and inhibiting the battery case 1000 from sliding longitudinally along the ribs 1020. The battery compartment cover 1040 is positionable over the second portion 1036 to cover the battery compartment. A battery compartment cover fastener 1068 is then used to couple the battery compartment cover 1040 to the second portion 1036 of the battery case 1000, thereby holding the batteries 1048 within the battery compartment and inhibiting the introduction of contaminants.

In order to assemble the battery case 1000 to the level 1010, one simply inserts the first portion 1032 into the interior of the frame 1012 from an open end of the frame 1012, such that the channels 1044 receive and slide along the ribs 1020, transversely aligning the first portion 1032 within the frame 1012. The first portion 1032 is then positioned within the interior of the frame 1012 to be adjacent the battery case opening 1024 such that the push button 1072 extends through the push button opening 1028. The second portion 1036 is then inserted through the battery case opening 1024 such that the openings on the tabs 1056 align with the openings on the first portion 1032. Tightening the fasteners 1060 couples the first portion 1032 to the second portion 1036, and thereby clamping the back web 1016 between the lip 1064 of the second portion 1036 and the outer wall 1066 of the first portion 1032, securing the battery case 1000 to the frame 1012 of the level 1010. The battery compartment cover 1040 is then positioned over the battery compartments and secured by the battery compartment cover fastener 1068 to the second portion 1036.

FIGS. 32-37 illustrate a level 1110 for determining whether an object or surface is level relative to true horizontal or adjusting an object or surface to be a level surface relative to true horizontal. The level 1110 may be used to measure and level at different angles, e.g., 0 degrees, and 90 degrees. In alternate embodiments the level 1110 may be used to measure and level at additional angles, e.g., 30 degrees, and 45 degrees. It should be readily apparent that the level 1110 may be used by a variety of users and skilled technicians to perform a variety of leveling functions.

With reference to FIG. 32, in the illustrated embodiment, the level 1110 is a box type level and has a frame 1112 substantially similar to the frame 912 of FIGS. 25-28. Specifically, the frame 1112 of the level 1110 shown in FIG. 32, includes a front web 1114 and a back web 1116 coupled to each of a top planar surface 1118, and a bottom planar surface 1122. The front and back webs 1114, 1116 are spaced apart and substantially parallel. The top planar surface 1118 is spaced apart from and substantially parallel to the bottom planar surface 1122. The pair of parallel webs 1114, top planar surface 1118, and the bottom planar surface 1122, define a hollow box-shaped interior of the level 1110. A pair of top ribs 1126 and a pair of bottom ribs 1128 protrude inwardly from the front and back webs 1114, 1116. The ribs 1126, 1128 extend along the length of the frame 1112 and are parallel to the top and bottom planar surfaces 1118, 1122. The front web 1114 defines a front opening 1130 and the back web 1116 defines a back opening 1132. The front opening 1130 and the back opening 1132 are substantially aligned, as shown in FIG. 32.

With continued reference to FIG. 32, the level 1110 includes a vial 1134, and a vial mounting assembly 1138. The vial mounting assembly 1138 includes a mounting cartridge 1142, a front vial surround 1146, and a back vial surround 1150. The mounting cartridge 1142 has a vertical web 1154 and a pair of flanges 1158 that form a substantially I-shaped body. The vertical web 1154 defines a vial mounting opening 1160 for receiving the vial 1134 (FIG. 33). The mounting cartridge 1142 is received within an open end of the frame 1112 so as to align and capture each of the flanges 1158 via one of the top ribs 1126 and the bottom ribs 1128, allowing the mounting cartridge 1142 to slide along the length of the frame 1112. The mounting cartridge 1142 is secured to the frame via a pair of fasteners 1162. The mounting cartridge 1142 defines a pair of injection holes 1166 that are each in fluid communication with a corresponding internal channel 1170 for receiving epoxy (FIG. 34). Each of the internal channels 1170 defines a first pair of outlets 1174 and a second pair of outlets 1178. The first pair of outlets 1174 are adjacent the vial mounting opening 1160 to provide epoxy generally around the perimeter of the vial 1134 to secure the vial 1134 within the vial mounting opening 1160 in the mounting cartridge 1142. The second pair of outlets 1178 are positioned adjacent the frame 1112 to provide epoxy generally between the mounting cartridge 1142 and the frame 1112.

The back vial surround 1150 includes snap fit members 1186, injection hole pins 1188, and a viewing window. The back vial surround 1150 is removably receivable within the back opening 1132. When received within the back opening 1132, the injection hole pins 1188 are received within the injection holes 1166. The snap fit members 1186 engage with corresponding prongs (not shown) on the mounting cartridge 1142 to secure the back vial surround 1150 within the back opening 1132 in the back web 1116. Similarly, the front vial surround 1146 includes snap fit members 1196, injection hole pins 1198, and a viewing window, and is removably receivable within the front opening 1130. When received within the front opening 1130 in the front web 1114, the injection hole pins 1198 extend into the injection holes 1166. The snap fit members 1196 engage with prongs 1194 on the mounting cartridge 1142 to secure the front vial surround 1146 within the front opening 1130 in the front web 1114 and retain the vial 1134 within the vial mounting opening 1160. The front and back vial surrounds 1146, 1150 are each co-molded with a thermoplastic elastomer (TPE) overmold.

In order to assemble the vial mounting assembly 1138 with the frame 1112, one simply inserts the mounting cartridge 1142 into the end vial mounting opening 1160 of the frame 1112 and slides the mounting cartridge 1142 into position adjacent the front and back openings 1130, 1132 in the frame 1112. The mounting cartridge 1142 is then secured to the frame 1112 via the fasteners 1162. Next, the vial 1134 is inserted through either the front or back vial openings 1130, 1132 in the frame 1112 and received within the vial mounting opening 1160 of the mounting cartridge 1142. The vial 1134 is initially set with cyanoacrylate (e.g., superglue) or a similar adhesive. Then, the back vial surround 1150 is inserted into the back opening 1132 in the frame 1112 and secured to the mounting cartridge 1142 via the snap fit members 1186 and the corresponding prongs. Epoxy, or a similar adhesive, is then injected into each of the injection holes 1166 in the mounting cartridge 1142 so as to flow through the internal channels 1170. The epoxy exits through the first pair of outlets 1174 providing and directing epoxy around the outer perimeter of the vial 1134 between the vial 1134 and the mounting cartridge 1142. The epoxy also exits the second pair of outlets 1178 providing epoxy between the mounting cartridge 1142 and the frame 1112. Lastly, the front vial surround 1146 is inserted through the front opening 1130 and secured to the mounting cartridge 1142 via the snap fit members 1196 and the corresponding prongs 1194.

Figure 35:
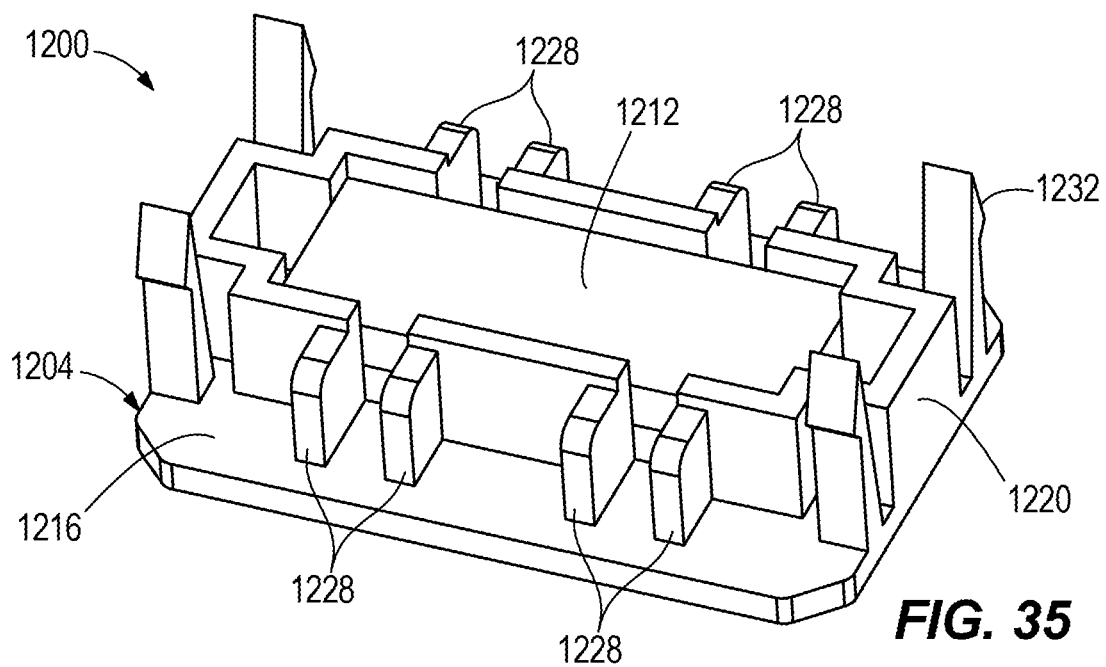
FIG. 35 is a perspective view of a magnet mounting assembly.
Figure 36:
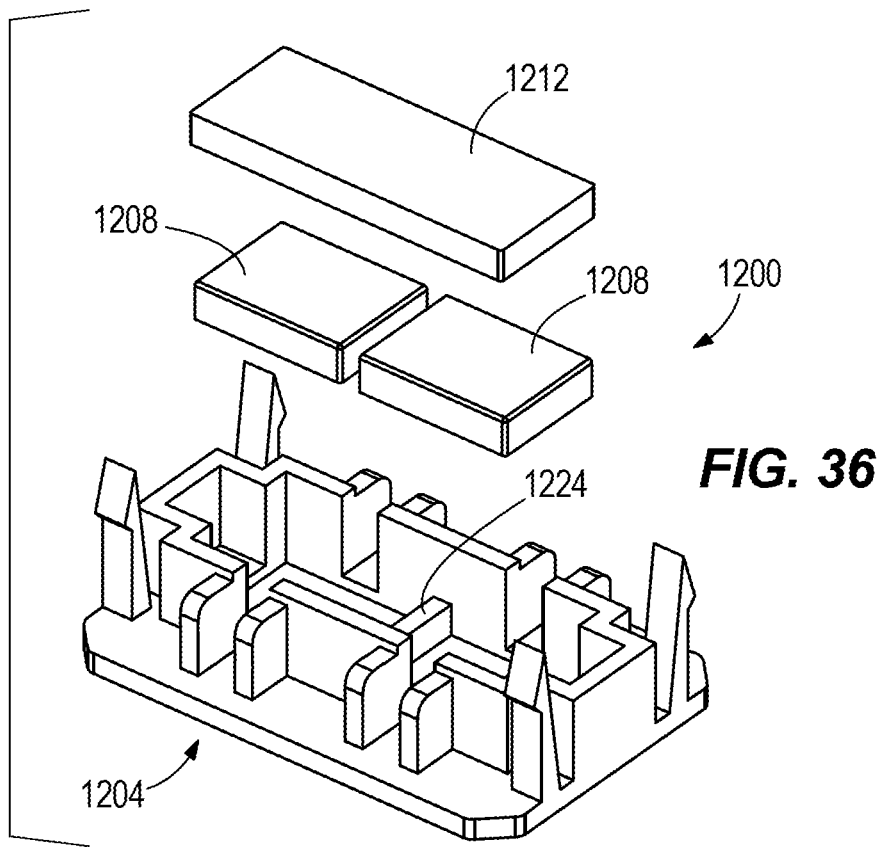
FIG. 36 is an exploded view of the magnet mounting assembly of FIG. 35.
Figure 37:
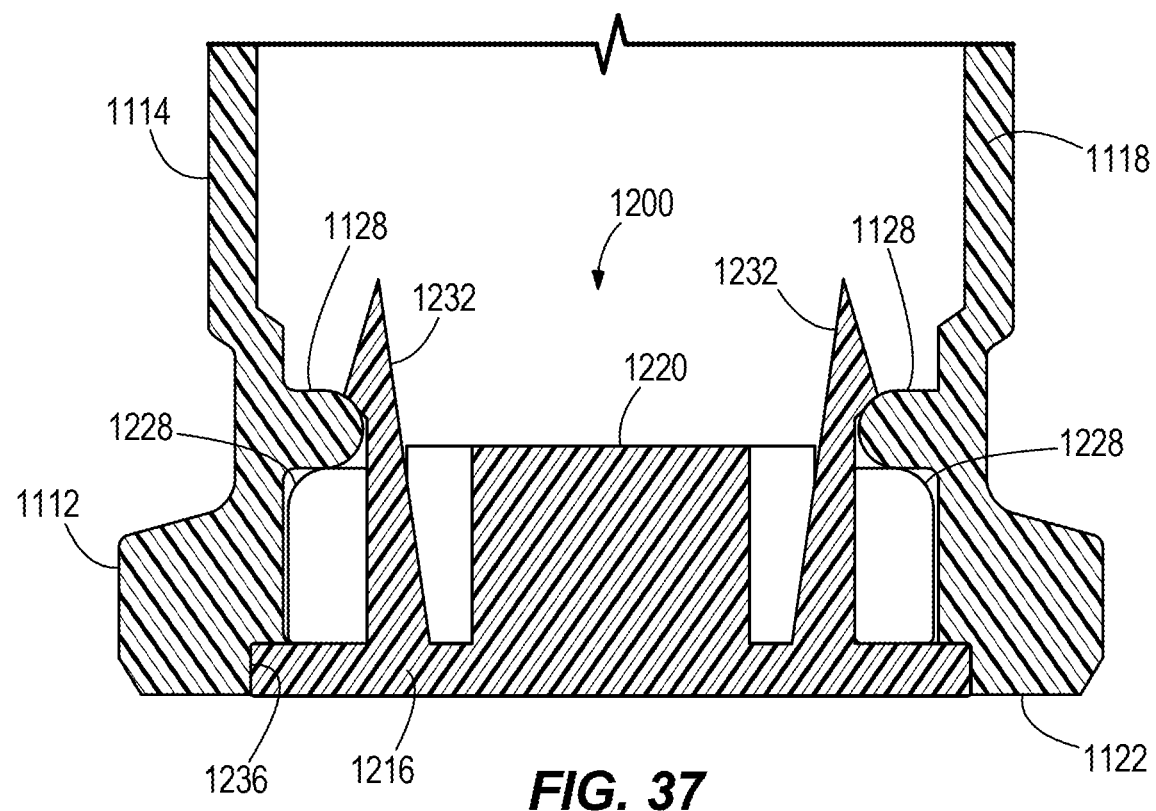
FIG. 37 is an enlarged cross sectional view of the magnet mounting assembly of FIG. 35, illustrating the magnet mounting assembly supported within the level of FIG. 32.

With reference to FIGS. 35-37, the level 1110 further includes a magnet mounting assembly 1200. The magnet mounting assembly 1200 includes a magnet mounting body 1204, a pair of magnets 1208, and a strap 1212. The magnets 1208 are neodymium magnets, and the strap 1212 is made of steel. The magnet mounting body 1204 has a base 1216, and a plurality of outer walls 1220 that extend from the base 1216 to define recesses that receive and retain each of the magnets 1208. The magnets 1208 are spaced apart by a half wall 1224, and are connected by the strap 1212 to form a magnetic circuit. The strap 1212 is also received by the outer walls 1220. The magnetic circuit formed by the strap 1212 increases the magnetic hold strength of the magnets 1208. The magnet mounting body 1204 further includes four resilient flexible snap fit arms 1232 that extend from the base 1216 and a plurality of protrusion 1228 that extend from the base 1216 and the outer walls 1220. The magnet mounting assembly 1200 is receivable within a magnet mounting assembly aperture 1236 defined by the bottom planar surface 1122. When the magnet mounting assembly 1200 is inserted into the magnet mounting assembly aperture 1236, the resilient flexible snap fit arms 1232 deflect inward due to the respective bottom ribs 1128 and snap over the bottom ribs 1128, thereby pinching the pair of bottom ribs 1128 between the snap fit arms 1232 and the protrusions 1228. The protrusions 1228 abut the bottom ribs 1128 to inhibit the magnet mounting assembly 1200 from being over inserted through the magnet mounting assembly aperture 1236. When the magnet mounting assembly 1200 is secured in place, the bottom surface of the base 1216 is substantially flush with the bottom planar surface 1122 of the frame 1112.

In order to assemble the magnet mounting assembly 1200 with the frame 1112, one simply inserts the magnets 1208 into the corresponding recesses defined by the outer walls 1220 and the half wall 1224. The strap 1212 is then inserted into the recess and magnetically connects the magnets 1208. The magnets 1208 and the strap 1212 may be held in place by an adhesive. Once the magnets 1208 and the strap 1212 are in place, inserting the magnet mounting assembly 1200 into the magnet mounting assembly aperture 1236 causes the snap fit arms 1232 to deflect inwardly and snap over each of the respective bottom ribs 1128, thereby securing the magnet mounting assembly 1200 to the frame 1112. The bottom planar surface 1122 of the level 1110 may then be placed against a ferromagnetic surface (e.g., an iron pipe) such that the magnets 1208 hold the level 1110 in place.

Although the invention has been described in detail with reference to certain preferred embodiments, variations and modifications exist within the scope and spirit of one or more independent aspects of the invention as described. For example, features of each of the various configurations of levels and vials described may be combined in any viable combination to obtain a vial or level including a vial with any combination of the various described features.

Furthermore, although the invention has been described with specific reference to UV light, other types of light and/or light sensitive components may also be used. For example, the vials could include or contain any compound/chemical that luminesces or fluoresces when exposed to a specific wavelength of light, regardless of whether the light is in the UV spectrum.

Furthermore, although the invention has been described with specific reference to vial assemblies that are configured to measure 0 degrees and 90 degrees, other vials configured to measure various angles may be used. For example, the vials could be oriented at, for example, 30 degrees and 45 degrees to measure and level at these angles.

Furthermore, although the level 10 illustrated and described above is a box level, the invention may also apply to other types of levels, such as torpedo levels, masonry levels, I-beam levels, utility levels, and the like.

In addition, the figures provided herein illustrate vials as being generally cylindrical. However, as one of ordinary skill in the art will realize, the inner bore of the vials is preferably barrel shaped to allow the bubble to settle at the center when the vial is oriented parallel to true horizontal.

Various features and advantages of the invention are set forth in the following claims.

What is claimed is:

1. A level, comprising:
    a frame including a top planar surface, a bottom planar surface, and a web coupling the top planar surface to the bottom planar surface, the top planar surface and the bottom planar surface being parallel;
    a vial assembly supported by the frame, the vial assembly comprising:
        a vial body defining an interior;
        a liquid located within the interior;
        an indicator bubble located within the interior; and
        a UV sensitive component reactive to UV light to increase visibility of a portion of the vial assembly; and
    a UV light source supported by the frame and positioned to direct UV light such that the UV light from the UV light source interacts with the UV sensitive component.

2. The level of claim 1, wherein the UV sensitive component emits visible light in response to absorption of UV light from the UV light source.

3. The level of claim 1, wherein the UV sensitive component is a component of the vial assembly that includes a UV reactive additive embedded in the component.

4. The level of claim 1, wherein the UV sensitive component is a sleeve located within the interior of the vial body and surrounding the indicator bubble, the sleeve is formed from a material and the sleeve comprises a UV reactive additive embedded in the material of the sleeve.

5. The level of claim 4, wherein the material of the sleeve is at least one of glass, acrylic or plastic.

6. The level of claim 4, wherein the vial assembly further includes a pair of end caps with one of the end caps positioned at each end of the vial body, wherein opposing ends of the sleeve extend over a portion of each of the end caps.

7. The level of claim 6, wherein the UV light source comprises a plurality of UV generating LEDs, each of the UV LEDs has a light emitting point, and each of the plurality of UV LEDs is positioned adjacent an end of the vial body and is oriented such that the light emitting point is positioned within the interior of the vial body.

8. The level of claim 1, wherein the UV sensitive component is a portion of the vial body in which a UV reactive additive is embedded in a material of the vial body.

9. The level of claim 1, wherein the UV sensitive component is a coating layer including a UV reactive additive.

10. The level of claim 9, wherein the coating layer is located along an inner surface of the vial body.

11. The level of claim 1, wherein the UV sensitive component is a UV reactive additive located within the liquid located within the interior of the vial body.

12. The level of claim 1, wherein the vial assembly further comprises a pair of vial surrounds, wherein the vial body is supported between the pair of vial surrounds, wherein the UV sensitive component is a portion of the pair of vial surrounds in which a UV reactive additive is embedded in the vial surrounds.

13. The level of claim 1, wherein the UV light source comprises a UV generating LED, the UV LED is positioned within an interior of the UV sensitive component such that the UV sensitive component surrounds the UV LED.

14. The level of claim 13, wherein the UV generating LED generates UV light having a wavelength between 375 nanometers and 410 nanometers, and wherein the UV sensitive component emits visible light in response to exposure to the UV light.

15. The level of claim 1, wherein the indicator bubble is a gas bubble located within the vial body.

16. A level, comprising:
    a frame including a top planar surface, a bottom planar surface, and a web coupling the top planar surface to the bottom planar surface, the top planar surface and the bottom planar surface being parallel;
    a vial assembly supported by the frame, the vial assembly comprising:

a vial body formed from a material and defining an interior;
a liquid located within the interior;
an indicator located within the interior; and
a UV reactive additive embedded in the material of a portion of the vial assembly; and
a UV light source supported by the frame and positioned to direct UV light toward the UV reactive additive;
wherein the UV reactive additive emits visible light in response to absorption of UV light from the UV light source.

17. The level of claim 16, wherein the UV reactive additive is at least one of: embedded in a material of the vial body and dispersed within the liquid of the vial assembly.

18. The level of claim 17, wherein the indicator is a gas bubble located within the interior of the vial body.

19. A level, comprising:
a frame including a planar surface;
a levelness indicator supported by the frame and configured to provide an indication of levelness of a workpiece engaged by the planar surface;
a UV sensitive component, wherein the UV sensitive component is configured to react to UV light to increase visibility of the levelness indicator; and
a UV light source supported by the frame and positioned to direct UV light such that the UV light from the UV light source interacts with the UV sensitive component.

20. The level of claim 19, wherein the levelness indicator is a gas bubble located within a liquid contained within a vial body.

* * * * *